(12) United States Patent
Kinjo

(10) Patent No.: US 7,275,043 B2
(45) Date of Patent: Sep. 25, 2007

(54) IMAGE PROCESSING SYSTEM AND ORDERING SYSTEM

(75) Inventor: Naoto Kinjo, Kanagawa (JP)

(73) Assignee: Fujifilm Corporation, Tokyo (JP)

( * ) Notice: Subject to any disclaimer, the term of this patent is extended or adjusted under 35 U.S.C. 154(b) by 851 days.

(21) Appl. No.: 09/982,824

(22) Filed: Oct. 22, 2001

(65) Prior Publication Data
US 2002/0047905 A1   Apr. 25, 2002

(30) Foreign Application Priority Data
Oct. 20, 2000 (JP) .............................. 2000-320382
Jan. 31, 2001 (JP) .............................. 2001-023030

(51) Int. Cl.
*G06Q 30/00* (2006.01)
(52) U.S. Cl. ..................................................... 705/26
(58) Field of Classification Search ................. 705/26, 705/27
See application file for complete search history.

(56) References Cited

U.S. PATENT DOCUMENTS

| 5,479,228 | A |   | 12/1995 | Tamamura et al. |
| 5,606,431 | A | * | 2/1997 | Park ............................ 358/503 |
| 5,666,215 | A | * | 9/1997 | Fredlund et al. ............. 358/487 |
| 6,366,359 | B1 | * | 4/2002 | Garland ..................... 358/1.15 |

FOREIGN PATENT DOCUMENTS

| DE | 195 07 091 A1 | 9/1995 |
| EP | 0 860 980 A2 | 8/1998 |
| EP | 0 920 179 A2 | 6/1999 |
| EP | 0 961 214 A2 | 12/1999 |
| EP | 0 961 214 A3 | 12/1999 |
| EP | 1 004 967 A1 | 5/2000 |
| GB | 2 407 227 A * | 4/2005 |
| JP | 10-171027 | 6/1998 |
| WO | WO99/04568 A1 | 1/1999 |
| WO | WO99/19816 A1 | 4/1999 |
| WO | WO 00/67484 A1 | 11/2000 |

OTHER PUBLICATIONS

No Author "Engineers preparing for digital age.", Television Digest, v31, n27, Jul. 8, 1991. Retrieved from Dialog File: 148, Acc#. 05405996.*
Phil Patton, "When your PC swallows the TV; television becomes and interactive medium—as last.", Computer Life, v2, n2, p. 149(2), Feb. 1995. Retrieved from Dialog File:275, Acc#.01773344.*
K. Priyantha Hewagamage et al.; Multimedia and Expo, 2000 IEEE International Conference on New York, NY, Jul. 30, 2000, pp. 323-326.

* cited by examiner

*Primary Examiner*—Naeem Haq
(74) *Attorney, Agent, or Firm*—Birch, Stewart, Kolasch & Birch, LLP

(57) ABSTRACT

The image processing system identifies a subject person corresponding to accompanying information based on consistency between the accompanying information and subject information and carries out image composition associating the accompanying information with a position of the subject person in a corresponding photographed image. The ordering system includes a first information apparatus having an image displaying unit and a second information apparatus capable of transmitting order data at optional timing desired by a customer to the first information apparatus with respect to an image displayed on the image displaying unit. The first information apparatus adds predetermined data relating to the displayed image corresponding to the optional timing to the order data to prepare goods order data and transmits the goods order data to a third information apparatus in a predetermined destination of transmission.

14 Claims, 8 Drawing Sheets

IMAGE PROCESSING SYSTEM AND ORDERING SYSTEM

BACKGROUND OF THE INVENTION

1. Field of the Invention

The present invention relates to an image processing system and an ordering system and, in particular, to an image processing system for compositing additional information concerning a subject with respect to a photographed image to output a composite image and an ordering system with which a customer places an order for goods while watching a television program, using a personal computer, playing a game, or watching a movie or the like, or again, from a reserved scene, or places an order for a print of a displayed scene or for a recording medium on which image data on the scene is recorded. (In the present invention, a recording medium for recording image data is to be simply referred to as "recording medium" or "image recording medium").

2. Description of the Related Art

Conventionally, an image photographed on a photograph film such as a negative film and a reversal film (hereinafter referred to as film) has been printed on a photosensitive material (printing paper) by so-called direct exposure (analog exposure) for projecting an image on a film onto a photosensitive material and subjecting the material to planar exposure.

On the other hand, in recent years, digital photoprinter has been put to practical use as a printing device utilizing digital exposure, that is, an image processing system. This image processing system is for photoelectrically reading an image of a photographed frame that is photographed by a conventional camera and recorded on a photograph film to obtain digital image data on the read image, or obtaining digital image data on a photographed frame photographed by a digital camera, then applying various kinds of image processing to the digital image data to have image data for recording, subjecting a photosensitive material to scan exposure with the recording light, which is modulated according to the image data for recording, so as to record an image (latent image) on the material, and preparing a (finished) photograph print.

With the digital photoprinter, an image is turned into digital image data and exposing conditions for printing can be determined by image data processing. Thus, correction of washed-out highlights and dull shadows of an image due to backlight, strobe photographing or the like, sharpness processing, correction of color failure and density failure, correction of under exposure and over exposure, correction of marginal luminosity deterioration, or the like can be preferably performed to obtain a high-grade photograph print that has been unable to be obtained with the conventional direct exposure. Moreover, composition of a plurality of images and division of an image as well as composition of characters, or the like can be performed by the image data processing. Thus, it is possible to output a photograph print that is edited/processed at will according to use, for example, compositing additional information or the like relating to a photographing date and time, a photographing situation and a subject.

In addition, since the digital photoprinter not only can output an image as a photograph print but also can supply image data to a computer or the like or save image data in an image recording medium such as a floppy disk, the image data can be utilized for a variety of uses other than a photograph.

However, conventionally, the above-mentioned composition of additional information with a photographed image has to rely on manual editing by an operator and there is no service for automatically compositing information concerning a subject with a photographed image. Thus, it causes troubles to composite additional information concerning a subject, a message or the like with a photographed image. Particularly when a plurality of subject persons are in one image, if messages or the like are added to respective subject persons, it is hard to understand which message is to be added to whom, which makes composition work very complicated.

On the other hand, conventionally, when one scene of a television program that is being broadcast or one scene on the screen of a television which is reproducing images recorded on a videotape is to be printed, a video printer for home use is used, However, since such a video printer for home use has a low resolution and image data transmitted by a television broadcast suffers from a deteriorated image quality due to an effect of noises during transmission and various kinds of processing in the video printer, a high-quality print cannot be expected. Moreover, print sizes are fixed with a largest size on the order of a postcard.

In order to address this problem, the applicant of this application has already proposed in JP 10-171027 A a method and a system for printing an image that makes it possible to print a scene of a television broadcast or the like with a large size and high quality.

This utilizes frame identification information for identifying each image frame associating it with each image frame of a television broadcast. If a customer wishes to print an image while the customer is watching each scene on a television screen, the customer reads out frame identification information of the image frame by a personal computer and transfers this frame identification information and orderer identification information/which is registered in advance, to a print order receiver through data communicating means such as a personal computer to place an order for printing. The print order receiver specifies a frame to be printed based on the transmitted frame identification information and reads corresponding original image data of high resolution out of an image database to print the image.

In addition, there is so-called television shopping as an ordering method of general goods. With the television shopping, a customer sees goods information transmitted by a television broadcast and, if there is goods that the customer wishes to buys places an order, for example, by telephone.

With the method and the system disclosed in the above-mentioned Japanese patent application, since a customer can order printing by transmitting only frame identification information and orderer identification information by a personal computer, printing can be ordered simply. In addition, since an image is printed using original image data, a large and high-quality print can be obtained. However, since all images are not always saved in a database, an image cannot be printed even if an order for the image is placed in some cases. In addition, the above-mentioned conventional television shopping requires time and labor because a customer has to place an order separately using means such as a telephone after watching the television.

SUMMARY OF THE INVENTION

The present invention has been devised in view of the above and other drawbacks, and it is a first object of the present invention to provide an image processing system that automatically composites information concerning subject persons with a photographed image even if a plurality of subject persons exist, thereby allowing a customer to easily obtain an image in which additional information of the photographed image (the subject) is composited with the photographed image and to conveniently obtain information of a subject person or arrange photographs in order.

It is a second object of the present invention to provide an ordering system for allowing a customer, while watching television or the like, to easily order printing of an image of a scene on a television screen or the like at an optional or desired timing, or again, at a preset timing and to order goods relating to the image or general goods.

In order to attain the first object described above, the first aspect of the present invention provides an image processing system, including: an image inputting unit for inputting an image of a subject; an image processing unit for applying image processing to the image inputted by the image inputting unit; and an image outputting unit for outputting the image to which the image processing is applied by the image processing unit; further comprising: an accompanying information obtaining unit for obtaining accompanying information concerning a subject person of the image; a subject information obtaining unit for obtaining subject information concerning the subject person from the inputted mage; a person identifying unit for identifying the subject person corresponding to the accompanying information based on consistency between the accompanying information and the subject information; and an image compositing unit for carrying out image composition associating the accompanying information with a position of the subject person in a corresponding photographed image based on a result of identification by the person identifying unit.

Preferably, a camera for photographing the subject obtains information recorded in a predetermined recording medium by communicating with a portable information apparatus held by the subject person or with an apparatus for collectively managing accompanying information for each subject person at the time of photographing, thereby obtaining the accompanying information, or the accompanying information is directly obtained from the apparatus for collectively managing accompanying information.

Preferably, all of the image processing unit, the image outputting unit, the accompanying information obtaining unit, the subject information obtaining unit, the person identifying unit and the image compositing unit are mounted with a camera, the image processing system is composed of the camera, and accompanying information concerning the subject person in a photographed image is composited with the photographed image in the camera.

Preferably, the camera communicates with a portable information apparatus held by a subject person or with an apparatus for collectively managing accompanying information for each subject person at the time of photographing, thereby obtaining accompanying information concerning the subject person.

Preferably, the camera further includes a voice obtaining unit, obtains voices of the subject person with the voice obtaining unit at the time of photographing and uses the voices in carrying out the person identification.

Preferably, the accompanying information includes a face image of a subject person corresponding to the accompanying information and the person identifying unit carries out identification of the subject person using the face image.

Preferably, the image outputting unit outputs an image in which the accompanying information is composited by at least one of a method of outputting the image as a print, a method of recording the image in an image file, a method of displaying the image on an image displaying device and a method of transferring the image by communication.

In order to attain the second object described above, the first mode of the second aspect of the present invention provides an ordering system comprising: a first information apparatus having an image displaying unit; and a second information apparatus capable of transmitting order data at optional timing desired by a customer to the first information apparatus with respect to an image displayed on the image displaying unit of the first information apparatus, wherein the first information apparatus having received the order data adds predetermined data relating to the displayed image corresponding to the optional timing to the order data to prepare goods order data and transmits the goods order data to a third information apparatus in a predetermined destination of transmission.

Preferably, the order data is orderer identification information or order indication information for specifically indicating the orderer identification information and contents of an order, information on the optional timing to be obtained by the first information apparatus is time information in the second information apparatus accompanying the order data or receiving timing itself of the order data in the first information apparatus, and the predetermined data is image data of the displayed image corresponding to the optional timing or goods characteristic information relating the displayed image.

Preferably, the order data includes print order data for ordering a print of an image displayed on the image displaying unit of the first information apparatus at the optional timing, the predetermined data includes image data of an image displayed on the image displaying unit of the first information apparatus at the optional timing, compressed image data or processed image data thereof and information related thereto, the goods order data includes print order data for ordering a print of an image displayed on the image displaying unit of the first information apparatus, and the first information apparatus transmits the print order data to the predetermined destination of transmission and the predetermined destination of transmission applies print processing to the print order data or records and accumulates the print order data in a predetermined image data accumulating device.

Preferably, the order data includes recording medium order data for ordering a recording medium in which data corresponding to an image displayed on the image displaying unit of the first information apparatus at the optional timing is recorded, the predetermined data includes data corresponding to the displayed image at the optional timing and information related thereto, the goods order data includes recording medium order data for ordering a recording medium in which data corresponding to the displayed image is recorded, and the first information apparatus transmits the recording medium order data to the predetermined destination of transmission and the predetermined destination of transmission applies processing for recording the recording medium order data in the recording medium or records and accumulates the recording medium order data in a predetermined image data accumulating device.

In order to attain the second object described above, the second mode of the second aspect of the present invention provides an ordering system comprising: a first information apparatus having an image displaying unit; and a second information apparatus capable of transmitting order data at optional timing desired by a customer to the first information apparatus with respect to an image displayed on the image displaying unit of the first information apparatus, wherein the second information apparatus transmits data requiring information to the first information apparatus as the order data at the optional timing, the first information apparatus having received the data requiring information returns predetermined data relating to the displayed image at the optional timing to the second information apparatus and/or a fourth information apparatus in a destination of communication designated by the customer, and the second information apparatus and/or the fourth information apparatus reproduces and edits the predetermined data relating to the received displayed image to prepare goods order data and transmits the goods order data to a third information apparatus in a predetermined destination of transmission via the first information apparatus or directly.

Preferably, the predetermined data relating to the displayed image is at least one of image data of the displayed image and information related thereto.

Preferably, the related information is goods related information or information for inputting an order, and the goods order data is edited data of the information for inputting an order and orderer identification information.

Preferably, the data requiring information includes information on the fourth information apparatus in the destination of communication designated by the customer.

Preferably, the data requiring information includes order data for designating the desired optional timing and information on the fourth information apparatus in at least one destination of communication designated by the customer and the first information apparatus distributes the predetermined data relating to the displayed image to the fourth information apparatus in the at least one destination of communication via a communication network.

Preferably, the order data is an image data requiring signal for requiring transfer of an image displayed on the image displaying means of the first information apparatus to the second information apparatus, the first information apparatus having received the image data requiring signal returns image data of the displayed image at the optional timing and compressed image data or processed image data thereof to the second information apparatus together with the related information, and the second information apparatus transmits the image data, the compressed image data or processed image data thereof and information related thereto to the predetermined destination of transmission as print order data via the first information apparatus or directly and the predetermined destination of transmission applies print processing to the print order data or records and accumulates the print order data in a predetermined image data accumulating device.

Preferably, the order data is an image data requiring signal for requiring transfer of an image displayed on the image displaying means of the first information apparatus to the second information apparatus, the first information apparatus having received the image data requiring signal returns data corresponding to the displayed image at the optional timing to the second information apparatus together with the related information, and the second information apparatus transmits the data corresponding to the displayed image and the related information to the predetermined destination of transmission as recording medium order data via the first information apparatus or directly and the predetermined destination of transmission applies processing for recording the recording medium order data in the recording medium or records and accumulates the recording medium order data in a predetermined image data accumulating device.

In the first and second modes of the second aspect of the present invention, it is preferable that the predetermined destination of transmission of the goods order data is set in the second information apparatus or set in the first information apparatus or set according to the predetermined data.

Preferably, the order data is transmitted from the second information apparatus to the first information apparatus by the customer at the desired optional timing while watching the displayed image.

Preferably, the order data is transmitted in advance from the second information apparatus to the first information apparatus by the customer as reservation information relating to the displayed image of the first information apparatus, the first information apparatus regards a point in time when the displayed image reserved by the reservation information is displayed on the image displaying means as the desired optional timing, automatically obtains predetermined data relating to the displayed image of the image displaying means at the optional timing and automatically transmits the predetermined data to the second information apparatus, and the second information apparatus automatically obtains the predetermined data.

Preferably, the print order data includes print instruction information or data recording instruction information.

Preferably, the data corresponding to the displayed image includes image data of the displayed image at the optional timing and compressed image data or processed image data thereof.

Preferably, the data corresponding to the displayed image is at least one of moving image data, voice data, text data and program data relating to the displayed image at the optional timing.

Preferably, the recording medium order data includes information on instruction for recording in the recording medium or information on instruction for recording in the predetermined image data accumulating device.

Preferably, the related information includes at least one of still image data, moving image data, voice data, text data and program data and is printed in association with the image data and the data corresponding to the displayed image and outputted to a computer readable recording medium in association with the image data or the data corresponding to the displayed image.

Preferably, the related information includes edition information and/or processing information of the image data or the data corresponding to the displayed image.

Preferably, when the first information apparatus is a television receiver and predetermined data relating to the displayed image at the optional timing includes image data of the displayed image of the television receiver, image data of an image received by the television receiver and displayed thereon and original image data in a broadcasting station transmitting the image data to the television receiver are properly used as the image data of the displayed image of the television receiver.

In order to attain the second object described above, the third mode of the second aspect of the present invention provides an ordering system comprising: a first information apparatus having an image photographing function; and a second information apparatus for transmitting subject related information in image photographing to the first information apparatus, wherein the first information apparatus transmits subject related information transmitted from the second information apparatus and photographed image data to a predetermined destination of transmission as print order data, and the predetermined destination of transmission composites the subject related information with the photographed image or prints the subject related information on the rear side of the photographed image to prepare a print or associates the subject related information with the photographed image to output them to a computer readable recording medium as image data, character data or voice data.

In order to attain the second object described above, the fourth mode of the second aspect of the present invention provides an ordering system comprising: a first information apparatus having an image photographing function, and a second information apparatus for receiving photographed image data and order data transmitted from the first information apparatus, wherein the second information apparatus adds subject related information to photographed image data and order data transmitted from the first information apparatus to transmit them to a predetermined destination of transmission, and the predetermined destination of transmission composites the subject related information with the photographed image or prints the subject related information on the rear side of the photographed image to prepare a print or associates the subject related information with the photographed image to output them to a computer readable recording medium as image data, character data or voice data.

In the first, second, third and fourth modes of the second aspect of the present invention, it is preferable that the goods order data of the customer is temporarily accumulated, and information for confirmation with order transmitting route information added to the goods order data is transmitted to the destination of communication of the customer for each order item based on orderer identification information.

DETAILED DESCRIPTION OF THE PREFERRED EMBODIMENTS

An image processing system and an ordering system in accordance with the present invention will be hereinafter described based on preferred embodiments shown in the attached drawings.

First, the image processing system in accordance with the present invention will be described with reference to FIGS. 1 to 4.

Figure 1:
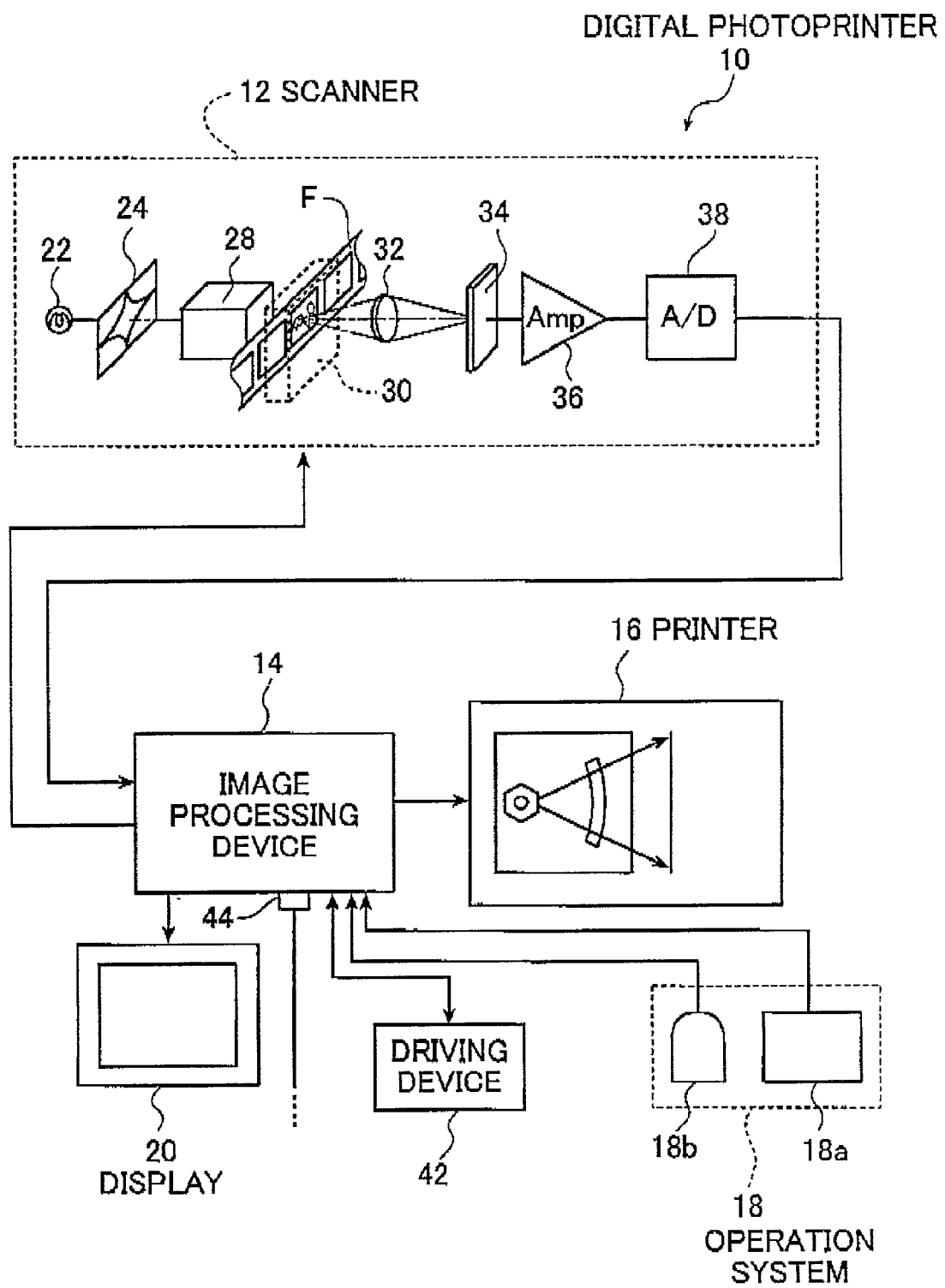
FIG. 1 is a block diagram schematically showing a digital photoprinter forming an image processing system in accordance with a first embodiment of a first aspect of the present invention.

FIG. 1 is a block diagram schematically showing a digital photoprinter forming an image processing system in accordance with a first embodiment of the present invention.

A digital photoprinter 10 shown in FIG. 1 basically includes a scanner (image inputting unit) 12 for photoelectrically reading an image photographed on a film F, an image processing device 14 for processing read image data to make it image data for outputting and, also, for performing an operation, a control and the like of the entire digital photoprinter 10, and a printer (image outputting unit) 16 for exposing a photosensitive material (printing paper) with a light beam, which is modulated according to the image data outputted from the image processing device 14, to record thereon the image and subjecting the photosensitive material to development to output a (finished) print.

In addition, an operation system 18 having a keyboard 18a and a mouse 18b for entering or setting various conditions, selecting or instructing processing, instructing color/density correction or the like, and a display 20 for displaying an image read by the scanner 12, various operational instructions, a screen for setting/registering conditions or the like are connected to the image processing device 14.

The scanner 12 is a device for photoelectrically reading an image photographed on the film F or the like and includes a light source 22, a variable diaphragm 24, a diffusion box 28 for making reading light incident on the film F uniform in the surface direction of the film F, an imaging lens unit 32, an image sensor 34 having a line CCD sensor corresponding to image reading for respective colors of R (red), G (green) and B(blue), an amplifier 36 and an A/D (analog/digital) converter 38.

In addition, in the print system 10, special purpose carriers 30 attachable to the main body of the scanner 12 are prepared according to a type and a size of a film such as a film for the Advanced Photo system (hereinafter referred to simply as APS) and a negative (or reversal) film of the 135 size, a form of a film such as strips and slides, and the like, whereby the print system 10 can cope with various kinds of films and processing by exchanging the carriers 30. An image that is photographed on the film F and served for preparation of a print (or the frame of the film containing such an image) is conveyed to a predetermined reading position by the carrier 30.

In reading an image photographed on the film F on such a scanner 12, reading light, which is emitted from the light source 22 and whose amount is adjusted by the variable diaphragm 24, is incident on the film F, which is positioned in a predetermined reading position by the carrier 30, and passes through the film F, whereby projecting light bearing an image photographed on the film F is obtained.

The carrier 30 includes a conveying roller pair for conveying the film F to a predetermined reading position and a mask having a slit for regulating the projecting light for the film F to a predetermined slit shape in the same direction as the direction of the line CCD sensor (main scanning direction). The film F is positioned in the reading position by the carrier 30 and has reading light incident thereon while being conveyed in the longitudinal direction of the film F coinciding with the auxiliary scanning direction perpendicular to the main scanning direction. Consequently, the film F is two-dimensionally slit-scanned by the slit extending in the main scanning direction and an image of each frame photographed on the film F is read.

A magnetic recording medium is formed on an APS film and a magnetic head for recording/reading information on this magnetic recording medium is disposed in the carrier 30 corresponding to the APS film (cartridge). The information recorded on the magnetic recording medium of the film F is read by this magnetic head and sent to the image processing device 14 or the like. Or again, information transferred from the image processing device 14 or the like to the carrier 30 is recorded on the magnetic recording medium of the film F by the magnetic head.

In addition, a code reader for reading a bar code such as a DX code, an extended DX code and an FNS code to be optically recorded on the film F or various kinds of information optically recorded on the film F is disposed on the carrier 30. Various kinds of information read by this code reader is sent to the image processing device 14.

As described above, reading light turns into projecting light that bears an image after passing through the film F held by the carrier 30. This projecting light is focused on a light receiving surface of the image sensor 34 by the imaging lens unit 32.

The image sensor 34 is a so-called three-line color CCD sensor having three line COD sensors for reading an R image, a G image and a B image, respectively, and extends in the main scanning direction. Projecting light for the film F is separated into three primary colors of R, G and B and photoelectrically read by the image sensor 34.

An output signal of the image sensor 34 is amplified by the amplifier 36, converted to a digital signal by the A/D converter 38 and sent to the image processing device 14.

The scanner 12 reads an image photographed on the film F by two image readings, namely pre-scan for reading an image with a low resolution and fine-scan for obtaining image data of an output image.

The pre-scan is carried out with reading conditions for pre-scan that are set such that the image sensor 34 can read images of all films to be read by the scanner 12 as input images without being saturated. On the other hand, the fine-scan is carried out with reading conditions for fine-scan that are set for each frame based on pre-scan data such that the image sensor 34 is saturated at a density slightly lower than a minimum density of the image (frame). Therefore, output signals obtained by the pre-scan and by the fine-scan are only different in terms of a resolution and an output level.

Note that, in the present invention, the scanner 12 is not limited to such a scanner for reading an image by the slit-scanning but may be a scanner utilizing planar exposure in which the whole of an image of one frame is read at one time. In this case, it is sufficient to use, for example, an area CCD sensor to sequentially insert color filters for respective colors of R, G and B between a light source and the film F and read an image by the area CCD sensor, thereby separating an image photographed on the film F into three primary colors to sequentially read for the three colors.

As described above, the output signal (image data) from the scanner 12 is outputted to the image processing device 14.

In addition, a driving device 42 is connected to the image processing device 14. The driving device 42 reads out image data and accompanying information or the like of a subject person from an image data recording medium such as a Smartmedia for recording digital image data obtained by photographing an image by a digital camera or the like, or outputs image data after processing to a general purpose image data recording medium such as an FD, a CD-R, an MO, a DVD, a Zip or the like.

Moreover, a slot 44 or the like is also connected to the image processing device 14 of this embodiment. The slot 44 or the like is directly connected to various image data supply sources such as a personal computer and a digital camera, equipment for collectively managing accompanying information of each subject person, or the like via a cable or via a communication network and obtains digital image data and its photographing information, accompanying information of a subject or the like. Therefore, in the digital photoprinter 10, the image processing device 14 may receive image data and information from these various image data supply sources other than an image on the film F read by the scanner 12 and carry out the following processing.

In the first embodiment to be described below, the case in which digital image data is supplied mainly from the scanner 12 to the image processing device 14 and outputted from the printer 16 as a photographic print will be described as a representative example.

Figure 2:
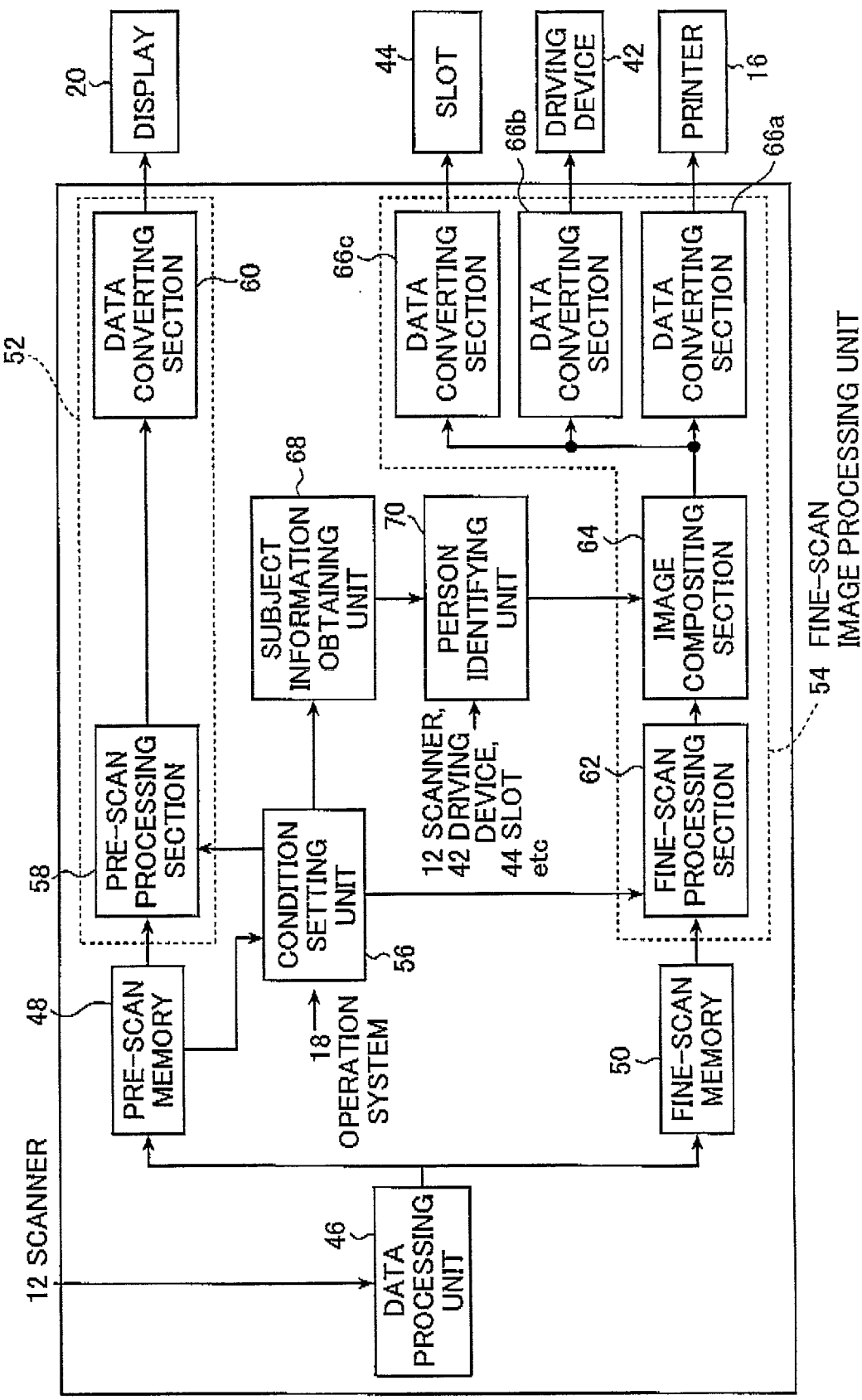
FIG. 2 is a block diagram schematically showing a configuration of an image processing device in accordance with the first embodiment of the first aspect of the present invention.

FIG. 2 is a block diagram schematically showing a configuration of the image processing device 14 in accordance with the first embodiment of the present invention.

The image processing device 14 applies predetermined image processing to image data that is read by the scanner 12 and sent to the image processing device 14 as digital data and outputs the image data to the printer 16 or the like. The image processing device 14 is composed mainly of a data processing unit 46, a pre-scan memory 48, a fine-scan memory 50, a pre-scan image processing unit 52, a fine-scan image processing unit 54 and a condition setting unit 56. In addition, in this embodiment, the image processing device 14 includes a subject information obtaining unit 68 for obtaining information concerning a subject person from an inputted image, a person identifying unit 70 for identifying a subject person based on consistency between accompanying information of a subject person and information of the subject person, which are obtained by a camera at the time of photographing or obtained from equipment collectively managing information, and an image compositing section 64 that is disposed in the fine-scan image processing unit 54 and composites an image associating the accompanying information with a corresponding subject person in the photographed image.

The data processing unit 46 applies logarithmic conversion, DC offset correction, dark time correction, shading correction or the like to the digital image data (input image data signal) for R, G and B outputted from the scanner 12. Processed pre-scan (image) data is stored in the pre-scan memory 48 and processed fine-scan (image) data is stored in the fine-scan memory 50.

Image data stored in the pre-scan memory 48 and the fine-scan memory 50 are called to the pre-scan image processing unit 52 and the fine-scan image processing unit 54, respectively, for image processing as required before outputting.

The pre-scan image processing unit 52 consists of a pre-scan processing section 58 and a data converting section 60. The pre-scan processing section 58 is a section for carrying out color balance adjustment, contrast adjustment, contrast correction, brightness correction, sharpness processing, dodging processing and other image processing. In additions the data converting section 60 converts image data to which image processing is applied in the pre-scan processing section 58 to image data corresponding to a display by the display 20 using 3DLUT or the like.

The fine-scan image processing unit 54 consists of a fine-scan processing section 62, image compositing section 64, data converting sections 66a, 66b and 66c. In the fine-scan processing section 62, various kinds of image processing such as color balance adjustment, contrast correction (tone processing), brightness correction, color saturation correction, sharpness processing and dodging processing are applied to fine-scan data in accordance with image processing conditions set in the condition setting unit 56 as described below. In the image compositing section 64, information accompanying a subject person in a photographed image is composited with the subject person in association with its position. The data converting sections 66a, 66b and 66c converts image data after image processing to a form corresponding to each image outputting means, namely the printer 16, the driving device 42 and the slot 44.

The condition setting unit 56 reads out pre-scan data from the pre-scan memory 48, determines reading conditions and image processing conditions of fine-scan and sets the conditions in each necessary part such as the pre-scan processing section 58 and the fine-scan processing section 62. More specifically, the condition setting unit 56 carries out preparation of a density histogram, calculation of characteristic amount of an image such as an average density, an LATD (largest area transmission density), a highlight (minimum density) and a shadow (maximum density) or the like from the pre-scan data. In addition, image processing conditions are determined according to an instruction made by an operator if necessary and image processing conditions are reset by an input from the operation system 18 such as the keyboard 18a and the mouse 18b.

In addition, as described above, the image processing device 14 in this embodiment includes the subject information obtaining unit 68 and the person identifying unit 70 and carries out identification of a subject person in an image in order to composite accompanying information of the subject person in a predetermined position in the image.

The subject information obtaining unit 68 receives pre-scan data and obtains subject information such as information for use in identifying a person and positional information of a subject in an image in order for use in compositing an image from the pre-scan data. For example, a face image of a subject person is preferably illustrated as information to be used in identifying a subject person. In this case, the subject information obtaining unit 68 extracts the face image of the subject person in an image from the pre-scan data.

In this case, accompanying information of the subject person includes face image data and the person identifying unit 70 carries out pattern matching of the extracted face image and the face image in the accompanying information to identify a person.

It is found which subject each piece of accompanying information should be composited with to from the person identification. Thus, in the image compositing section 64, accompanying information including a message or the like of each subject person is composited adapting it to a position of each subject person based on the positional information of the subject in the image obtained as described above.

An image in which accompanying information is composited is converted in each of the data converting sections 66a, 66b and 66c according to an output medium and outputted to an output medium desired by a customer.

Actions of the first embodiment will be hereinafter described.

In this embodiment, in photographing a multiplicity of subject persons with a camera, for example, the camera communicates with a hand-held terminal (PDA) carried by each subject person to obtain accompanying information of the subject person in question and record it on a predetermined recording medium. Then, an order for printing is placed with a laboratory and there prepared a print by compositing the accompanying information with an image of the relevant subject person.

Figure 3:
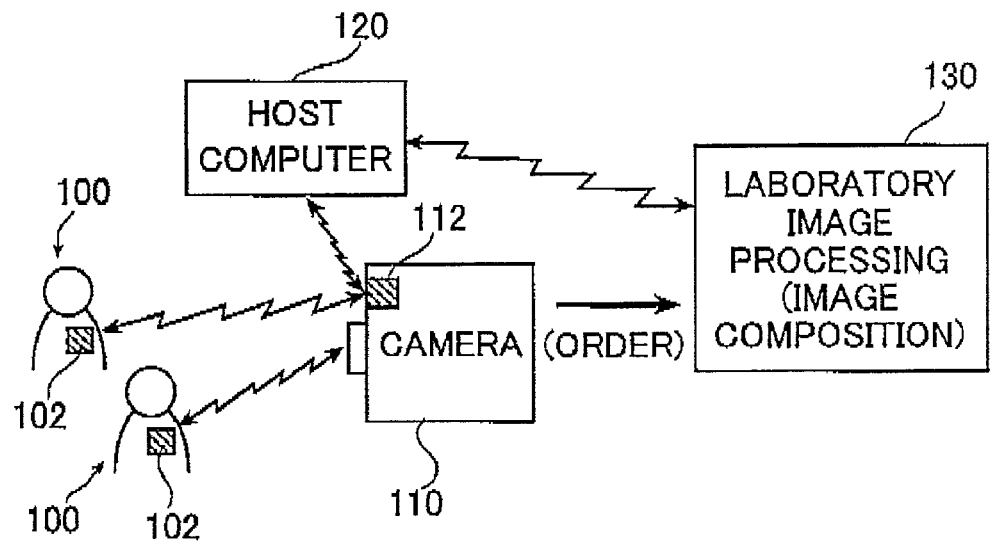
FIG. 3 conceptually illustrates actions of the first embodiment of the first aspect of the present invention.

FIG. 3 conceptually illustrates actions of the first embodiment of the present invention.

For example, in a certain party site or the like, if a multiplicity of subject persons 100 are photographed by a camera 110, each subject person 100, who is a participant, has its own hand-held terminal (hereinafter referred to as PDA) 102, in which message information (accompanying information) with a face image of the subject person is recorded in advance.

This message information is not limited to, for example, text data but may be image data and voice data.

In photographing each subject person 100 with the camera 110, a photographer communicates between a communication terminal 112 provided on the camera 110 side and the PDA 102 of each subject person and obtains message information (accompanying information) of each subject person 100. The camera 110 may be a silver salt camera or a digital camera (still image/moving image).

The camera 110 records the obtained message information in a predetermined recording medium. Here, a recording medium and a recording method are not specifically limited. Message information may be magnetically recorded in a film or may be recorded in an IC chip, which is inserted in a film cartridge, or, in the case of a digital camera, may be written in a recording medium such as a Smartmedia together with image data.

In addition, if message information is recorded in a recording medium separate from a film, it is preferable to record a film ID, a frame number and the like together with the message information such that they are used for image composition later.

In addition, it is also possible to ask participants of a party in advance, for example, to wear a special name plate having a function of linking with a PDA of each participant to emit light when exchanging information with a camera and to photograph the name plate with the camera. In this way, at the time of photographing, when the camera and each subject person communicate with each others the name plate of a subject person being currently photographed emits light at the communication timing. Therefore, it becomes easy to figure out a position of each person in a photographed image later.

In addition, rather than each participant of a party owning a PDA, for example, it is also possible that a host of the party manages message information of each participant collectively by a host computer 120 and the host computer 120 on the host side and the camera 110 communicate with each other and the camera 110 obtains message information of each participant.

Further, the communication between the camera 110 and the host computer 120 may be performed at each photographing time or may be collectively performed at a predetermined timing after photographing. In this way, since each subject person 100 is neither required to own the PDA 102 nor to perform communication between the camera 110 and the PDA 102 of each subject person 100, complexity for a photographer to photograph while paying attention to communication between each participant and the PDA 102 can be eliminated. Alternatively, rather than obtaining message information by the camera 110, a laboratory 130 may obtain message information directly from the host computer 120 at the time of image processing in the laboratory 130 later.

In addition, if the camera 110 has a voice data obtaining function, the camera 110 may obtain voice date generated by a subject person as message information. In this case, a gender, an age or the like may be determined according to this voice data and used for identifying a person.

Alternatively, in a case of photographing a moving image by a digital camera, a person may be identified by deriving a position in an image from a timing for each subject person speaking and a timing for a mouth moving, estimating a gender, an age or the like from voices of the subject person and combining clientele determining processing with the estimation. In addition, if voices are included as message information, a speaker may be recognized according to registered voices and voices at a photographing time to identify a person.

When photographing is performed and message information of each subject person is obtained together with image data by a camera as described above, these are carried to the laboratory 130 and printing is ordered, image processing is carried out by the digital photoprinter 10 as shown in FIG. 1 and a print is prepared in the laboratory 130.

Upon receiving an order, an operator inserts the film F in a predetermined carrier 30 and sets it in a predetermined reading position of the scanner 12. Pre-scan image data pre-scanned and read in the scanner 12 is applied, as digital input image data, each processing such as logarithmic conversion, DC offset correction, dark time correction and shading correction in the data processing unit 46 as described above and then stored in the pre-scan memory 48. In addition, the condition setting unit 56 calls pre-scan data from the pre-scan memory 48, calculates a characteristic amount of an image or the like and determines image processing conditions. In addition, after adjusted by an instruction of the operator, the pre-scan data is applied correction such as color balance adjustment, color density correction or brightness correction and contrast correction or color saturation correction according to the determined image processing conditions in the pre-scan processing section 58 of the pre-scan image processing unit 52. Further, after sharpness processing or dodging processing is performed according to an instruction of the operator, the pre-scan data is converted using 3DLUT or the like in the data converting section 60 and displayed on the display 20.

Further, in the case of a digital image photographed by a digital camera or the like, it is possible to obtain image data via a disk drive from an image data recording medium such as a floppy disk (FD), an MO, a Zip, a CD-R and a DVD or obtain image data from a communication network. In this case, the image data is stored in the pre-scan memory 48 and the fine-scan memory 50 and the subsequent image processing is performed in the same manner as that for image data read by the scanner 12.

In addition, when processing for pre-scan data is carried out, for example, in the scanner 12, message information is simultaneously read from a magnetic recording medium of a film or an IC chip or the like inserted in a film cartridge and message information including face image data of a subject person is sent to the person identifying unit 70. On the other hand, the subject information obtaining unit 68 receives the pre-scan data via the condition setting unit 56 (or directly from the pre-scan memory 48) and extracts subject information necessary for identification of a person or composition of an image later.

The subject information obtaining unit 68 extracts a face image of a subject person in an image.

As a method of extracting a face area of a person, particularly hair, there is, for example, a method disclosed in JP 8-122944 A of the applicant of this application. In addition, as a method of extracting a specific area such as a face area of a person, methods disclosed in JP 4-346333 A, JP 5-158164 A, JP 5-165120 A, JP 6-160993 A, JP 8-184925 A, JP 9-101579 A, JP 9-138470 A, JP 9-138471 A, JP 9-146194 A, JP 9-197575 A and the like can also be preferably utilized.

The person identifying unit 70 carries out pattern matching of the face image of the subject person extracted by the subject information obtaining unit 68 and a face image included in message information to identify the subject person and confirm which message information is composited with which image. At this point, information such as a gender and an age is used if such information exists in the message information, or, even if such information does not exist, a gender, an age, an occupation or the like is estimated by the following clientele determination method and such estimated information is utilized to carry out person identifications whereby the person identification can be carried out more accurately.

As the clientele determination method for estimating a gender, an age, an occupation or the like, for example, a method of estimating a gender, a person can be estimated as female if, as a result of extracting a face image (hair), a volume of a hair area is large, if the hair area is long, if an outline of the torso and the lower part seem to be a skirt judging from a shape of clothes extracted from the pattern matching of the outline, or if color contains many shades of red and pink. In addition, from a result of extracting a face image, it is also possible to estimate a gender based on whether a person wears makeup or not, uses a lipstick or not or wears accessories or not.

In addition, as a method of estimating an age, a method of calculating a height of a subject person from a photographed image to estimate that a person is an adult, a junior high or a high school student, an elementary school student, an infant or the like based on a size of a height is possible. Alternatively, if a volume of an extracted hair area is small or if a color of hair is white, a person is estimated to be an aged person.

In addition, an occupation is estimated mainly according to clothes. For example, if clothes are likely to fall into a category of suits judging from a shape, a density and a tint of clothes, a subject person can be estimated as belonging to a white-collar worker layer. If clothes is likely to fall into a category of uniforms judging from a shape and a color of the clothes, a subject person can be estimated as a student including a junior high and a high school students taking a result of estimation of a gender and an age into account.

Further, a clientele determining method is not limited to these but various other methods can be used.

On the other hand, fine-scan is performed in accordance with conditions determined by the condition setting unit 56 and predetermined image processing is applied to read fine-scan data in the fine-scan processing section 62.

Thereafter, in the image compositing section 64, message information corresponding to each subject person is composited which is adapted to a position of a subject person in the image extracted by the subject information obtaining unit 68 using the above result of person identification.

In this case, when communication is performed between a camera and a PDA of each subject person at the time of image photographing, it is also possible to give different message information for each consecutive photographing frame. In doing so, it is sufficient that identification information such as a film ID and a frame number indicating which message information corresponds to which frame is included in message information. In this case, the image compositing section 64 can composite an image using the identification information such as a frame number. Thus, person identification becomes unnecessary but it is necessary to perform extraction of a face image or the like for compositing an image to extract a position of a subject person in an image.

Image data to which image compositing processing was applied may be converted to data for a print output by the data converting section 65a and outputted as a print from the printer 16 as desired by a customer, or may be converted to data for an image file output by the data converting section 66b and outputted to a predetermined recording medium from the driving device 42. Alternatively, the image data may be converted to a predetermined form by the data converting section 6c and laid open through a communication network from the slot 44 or transmitted to a predetermined terminal apparatus.

In this case, a composited image itself may be returned to the customer (or each subject person) or only access destination information for obtaining image data may be returned.

A second embodiment of the present invention will be described next.

In this embodiment, a camera itself forms an image processing system and person identification processing and image compositing processing are carried out by the camera.

Figure 4:
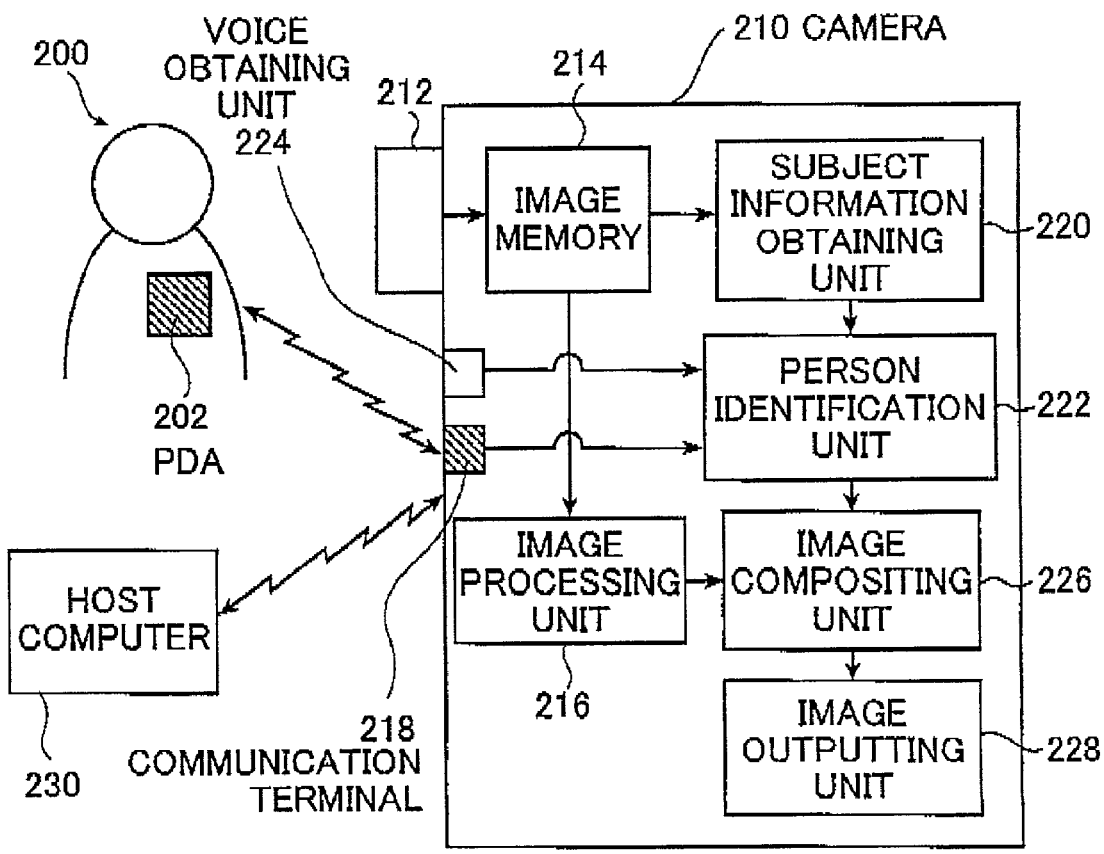
FIG. 4 is a block diagram schematically showing a camera forming an image processing system in accordance with a second embodiment of the first aspect of the present invention.

FIG. 4 schematically shows a configuration of a camera forming an image processing system in accordance with this embodiment.

As shown in FIG. 4, a camera 210 of this embodiment is a digital camera and includes an image inputting unit 212 for photographing a subject person 200, an image memory 214 for storing photographed image data and image processing unit 216 for carrying out predetermined image processing, and further includes a communication terminal 218 for communicating with a PDA 202 owned by the subject person 200 to obtain message information, a subject information obtaining unit 220 for obtaining information of a subject person from inputted image data, a person identification unit 222 for identifying a person from the information of the subject person and the message information, an image compositing unit 226 for compositing message information to the inputted image, an image outputting unit 228, and a voice obtaining unit 224 for inputting voice information of a subject person in order to use in person identification and the like. In this way, the camera 210 forms one image processing system for performing from image input to image processing and image output.

The image inputting unit 212 is for performing ordinary image photographing by an image pick-up element such as a CCD via a lens. An image photographed and inputted is stored in the image memory 214 as digital image data. The image data stored in the image memory 214 is called to the image processing unit 216, where image processing such as white balance adjustment and y correction is applied to the image data.

On the other hand, the subject information obtaining unit 220 calls image data from the image memory 214 and extracts a face image or the like of a subject person. The person identification unit 222 receives the face image of the subject person from the subject information obtaining unit 220 and identifies the subject person by applying pattern matching to the face image of the subject person and a face image of a subject person in the message information received from the communication terminal 218. In addition, in this case, accuracy of the person identification may be improved utilizing voice data inputted from the voice obtaining unit 224.

When the person identification is performed, based upon the result, the message information is composited in an appropriate position with respect to a subject person in an image after the image processing in the image compositing unit 226. The image data after composition is outputted from the image outputting unit 228. The outputted image is displayed on an image displaying device such as a liquid crystal panel and, at the same time, recorded in a predetermined image recording medium.

Note that, although the communication terminal 218 communicates with the PDA 202 owned by each subject person 200 at the time of photographing to obtain message information, a method of obtaining message information is not limited to this. For example, the communication terminal 218 may communicate with an apparatus such as a host computer 230 or the like that collectively manages message information to obtain message information from the apparatus. Alternatively, the camera 210 may be connected to a personal computer (not shown) to obtain message information from the host computer 230 via a communication line.

In addition, as to a form of outputting an image, an image may be outputted as a print, for example, as long as the camera 210 has a print outputting function.

As described above, since information concerning a subject person can be composited automatically according to each of the above-mentioned embodiments, it is convenient for obtaining information of a subject person and arranging information in order. In particular, for example, it is very convenient for exchanging information among participants of a party or the like.

In particular, according to the second embodiment, since all processing can be carried out on the camera side, an image in which message information is composited can be obtained simply and promptly and information of a subject person can be obtained more easily.

Further, if an image is outputted as digital data, when a pointing device is clicked on a subject person at the time of reproducing an image, accompanying message information may be reproduced and outputted next to the subject person. In addition, message information may be composited with a photographed moving image. Moreover, in these cases, it is possible to use a still image, a moving image, a text, voices or the like as message information.

Next, an ordering system in accordance with a second aspect of the present invention will be described with reference to FIGS. 5 to 11.

First, a first embodiment of the second aspect of the present invention will be described. The first embodiment is the case in which, for example, a customer places an order for printing one scene of a television screen while watching the television.

Figure 5:
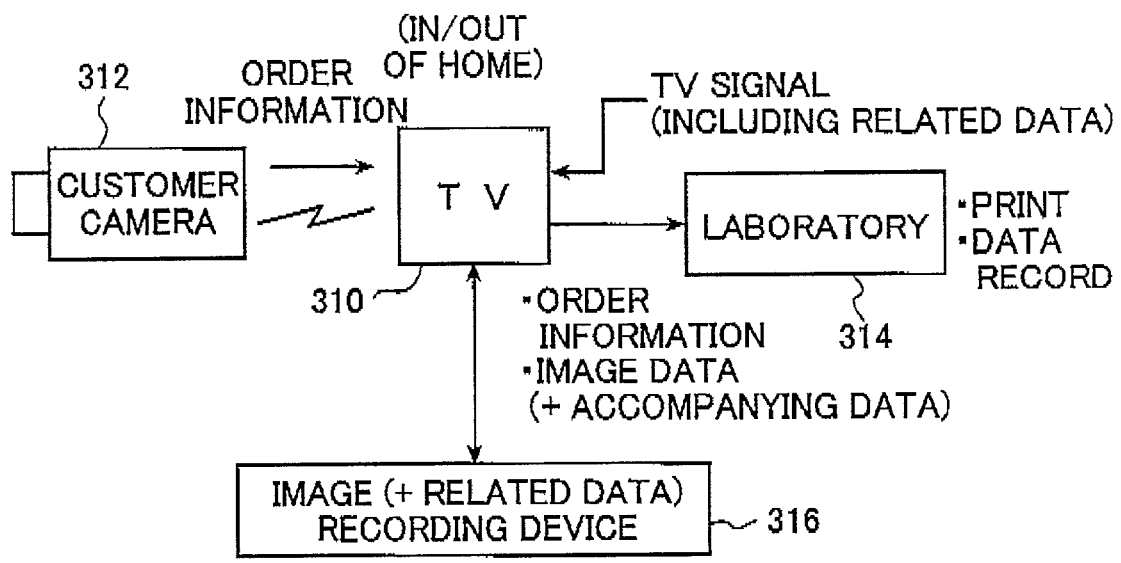
FIG. 5 illustrates a schematic configuration of an ordering system in accordance with a first embodiment of a second aspect of the present invention.

FIG. 5 schematically illustrates a configuration of an ordering system in accordance with the first embodiment.

The ordering system shown in FIG. 5 is basically composed of a television 310 that is a first information apparatus, a camera 312 that is a second information apparatus and a laboratory 314 that is a destination to which goods order data is sent.

The television 310 is a television having a network communication function, and it not only receives radio waves so as to reproduce images and voices to display reproduced images on a screen and generate reproduced voices but also has an information transmission function capable of transmitting, for example, order information of a customer to an optional destination. Moreover, it is assumed that the television 310 is a digital television and has a storage device (e.g. a hard disk (HD) 316 for temporarily recording and accumulating received image data. The storage device 316 may be built into the television 310 or of external type. In this case, related information corresponding to an image in question is also recorded in the storage device 316 together with the digital image data (hereinafter referred to simply as "image data").

The camera 312 is connected to the television 310 by a wireless communication technology such as the Bluetooth, for example, and has an image obtaining mode separate from ordinary photographing. If a customer presses a shutter or a predetermined key in this mode while the customer is watching the television 310, print order information for an image displayed on the display screen of the television 310 at that point is transmitted to the television 310 side. Further, the television 310 may be an ordinary television for home use that is installed indoors or may be one installed outdoors such as on the street. Any television will do as long as order information can be transmitted from the camera 312 to the television 310 side by wireless communication.

In addition, this information apparatus on the customer side (second information apparatus) is not limited to such a camera but may be any apparatus as long as it can transmit information to the television 310 by wireless communication, such as a PDA (hand-held terminal), a personal computer, a cellular phone and a remote control.

Actions of this embodiment will be hereinafter described.

The television 310 receives a television signal from a television station to display a reproduced image on the display screen of its own and, at the same time, records image data on the displayed image in the storage device 316. Besides image data, the television signal includes, for example, related information (hereinafter referred to also as "related data") such as description or the like about the image (scene) or the program. Such related data may be transmitted utilizing a space area of radio waves as, for example, in the teletext broadcasting.

If there is a scene that a customer wishes to obtain while watching images displayed on the screen of the television 310, the customer uses the camera 312 set to an image obtaining mode in advance and presses its shutter at an optional selection timing. Then, order data is transmitted from the camera 312 to the television 310 side.

The order data includes orderer identification information (customer ID) and order indication information. The order indication information is information for specifically indicating contents of an order and includes, for example, print size, the number of prints, contents of desired image processing and a method of receiving a print. The contents of desired image processing may be various kinds of image processing that can be performed by an image processing device used in the first aspect of the present invention, for example. As image processing, there may specifically be designated image modification processing such as density/tint adjustment, tone adjustment, change in general impression, and change of ordinary finishing into sepia finishing, monochrome finishing or the like, as well as image edition processing such as producing of an index image for a plurality of frames, image compositing, position/size adjustment, and superimposition of characters. Accordingly, the order data may of course include information concerning such image modification or edition processing as above. The order data may further include message information of a customer.

Transmission of order data from the camera 312 to the television 310 may be carried out at each instance when the customer presses the shutter. Alternatively, order data may be once stored in the storage device in the camera 312 together with time data (time information of the camera at that time) when the customer presses the shutter, and then order data for a plurality of times of pressing the shutter may be collectively transmitted to the television 310 side at a separate timing.

Upon receiving order data from the camera 312, the television 310 transmits the received order data and image data (in some cases, with the addition of image related data (goods characteristic information)) as goods order data to the laboratory 314 via a network. A timing for selecting image data to be transmitted may be according to time information of the time when the customer pressed the shutter of the camera 312 or may be according to a timing when the television 310 receives order data from the camera 312.

The laboratory 314 is provided with the digital photoprinter 10 as shown in FIGS. 1 to 4, for example. Upon receiving goods order data, the laboratory 314 applies predetermined image processing to the transmitted image data in accordance with the order data using the image processing device 14 shown in Pigs. 1 and 2, for example, and prepares a print with the printer 16 shown in FIGS. 1 and 2, for example. In addition, the laboratory 314 may record and store the image data in a specified image data storing device for possible reorder in the future, for example. Further, as optional processing in response to the request of a customer, the laboratory 314 may print a description or an advertisement of a scene (or a program) using image related data, or print message information of the customer and the like on the back of a print. In addition to or apart from such printing, the image data may be recorded on various types of general purpose recording media, such as a FD, a CD-R, an MO, a DVD and a Zip, by the driving device 42 shown in FIGS. 1 and 2, for example. In this case, a description or an advertisement of an image whose image data is to be recorded, message information of a customer or the like may be recorded coincidentally with the image data as accompanying therewith.

Next, a second embodiment of the present invention will be described.

The second embodiment is the case in which a customer orders printing of one scene of a movie while watching a movie in a theater.

Figure 6:
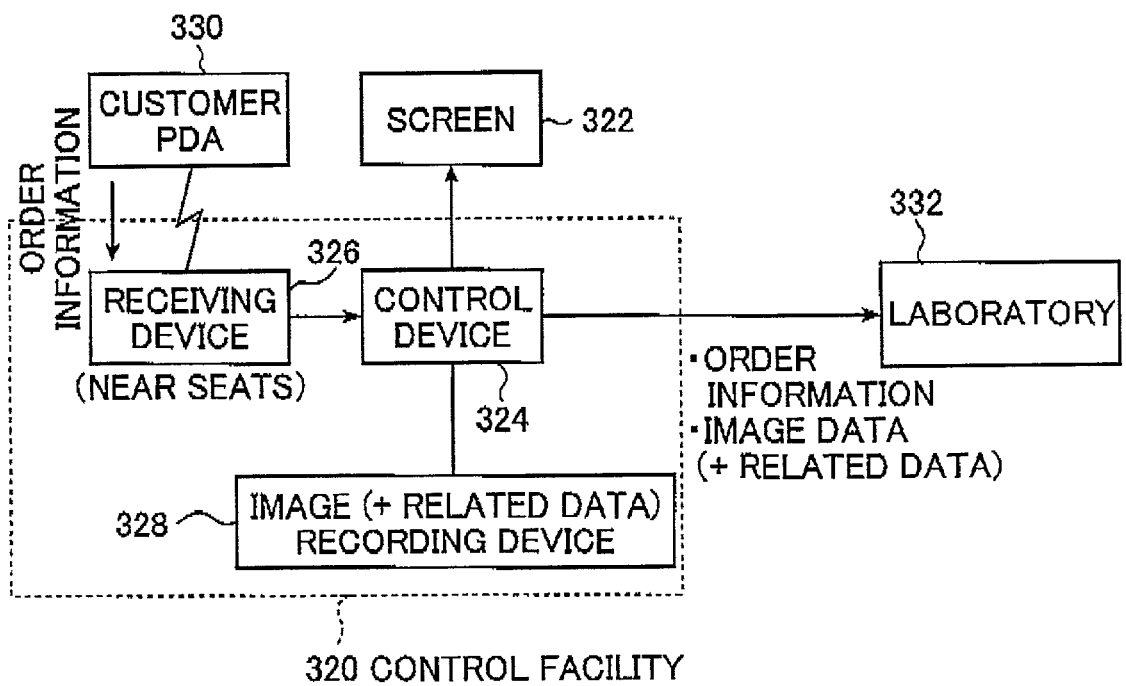
FIG. 6 illustrates a schematic configuration of an ordering system in accordance with a second embodiment of the second aspect of the present invention.

FIG. 6 illustrates a schematic configuration of an ordering system in accordance with the second embodiment.

The ordering system shown in FIG. 6 is basically composed of a communication and control facility 320 of a theater that is a first information apparatus, an information terminal apparatus (e.g., a hand-held terminal such as PDA) 330 of a customer that is a second information apparatus and a laboratory 332 that is a destination to which goods order data is sent.

It is assumed that a movie is projected using digital image data in a theater in this embodiment. The communication and control facility 320 includes a control device 324 and a receiving device 326. The receiving device 326 is installed near seats of the theater and connected to the control device 324 via wire or wireless to receive a signal (order data) from the information terminal apparatus 330 of a customer and transmit it to the control device 324.

The control device 324 projects an image on a screen 322 and, at the same time, receives order data of a customer from the receiving device 326 to transmit it to the laboratory 332 together with image data or the like through a network line or the like. In addition, a storage device 328 for recording an image and its related data is connected to the control device 324.

The information terminal apparatus 330 of a customer is not limited to a hand-held terminal such as PDA but may be, for example, a cellular phone, a remote control provided in a seat or the like.

Actions of this embodiment will be hereinafter described.

The control device 324 projects a movie image on the screen 322 on the basis of image data as digital data. If there is a scene that a customer wishes to obtain while watching the screen 322, the customer transmits order data from the information terminal apparatus 330 at hand to the receiving device 326 installed near the seat by pressing a key at an optional or desired selection timing. In this case, the order data includes orderer identification information (customer ID) and order indication information as in the first embodiment.

The receiving device 326 transmits the received order data to the control device 324 at every reception of order data or at one time after it has received order data several times. The control device 324 calls image data and related data corresponding to the order data from the storage device 328 at every reception of order data or at one time after it has received order data several times and transmits them to the laboratory 332 together with the order data, as goods order data as a whole.

The laboratory 332 applies predetermined image processing designated by the order data to the transmitted image data to prepare a print or record the processed image data on a recording medium, as in the first embodiment described before. In this embodiment, similar to the first embodiment, related data such as a description of a displayed image (scene) or the program in question, or message information of a customer, a theater or the like may be back printed, or recorded on a recording medium coincidentally with the image data as accompanying therewith.

In addition, as another example of this embodiment, the ordering system may be configured as a system for an image of a poster instead of an image of a movie projected on a screen, with which system order data is received from an information terminal apparatus of a customer and then transmitted to a laboratory by a transceiver, which is set for example on the back of the poster, to print the image of the poster or output a recording medium on which the image data of the image in question is recorded.

Though the entire image displayed on a screen of a television or a movie is to be ordered in the first and second embodiments as described above, the present invention is not limited to such. A part of an image displayed on a screen may be ordered or even several parts of an image displayed on a screen may selectively be ordered. In these cases, positioning information, the number of orders and the like with respect to an image on a screen may be designated by key operation or handwriting on the aforementioned information terminal apparatus such as a camera, a PDA, a cellular phone, a remote control and a personal computer to add to the order data.

In various embodiments as above, the first information apparatus is a television provided with a communication function, or a communication and control facility in a theater, or a communication device (transceiver) set on a poster. The present invention is not limited to such apparatus and any of a game machine, a personal computer and other apparatus with a display may also be used as the first information apparatus as long as it is provided with a communication function.

In respective embodiments as described above, and in the case that a plurality of order data are transmitted to the first information apparatus such as a television by a plurality of customers, such order data may be classified according to customers or images (goods) and goods order data may be produced according to customers or images (goods) on the first information apparatus side to transmit to a laboratory. Specifically, a plurality of order data for different kinds of images (goods) may be classified as from one and the same customer or a plurality of order data from different customers may be classified as for one and the same image (goods).

In respective embodiments as described above, moreover, it is possible to automatically detect images, which are analogous to the displayed image of a television or a movie once designated with an information apparatus such as a camera and a PDA on the customer's side at a desired selection timing, among, for example, the images displayed within a predetermined period after a time designated or the images stored in a storage device to collectively display them toward the customer or collectively transmit the image data on them to the customer.

In addition, in the embodiments as above, related data such as a description of a displayed image (scene) or the program in question and message information of a theater or the like to be printed on the back of a print or recorded on a recording medium coincidentally with the image data as accompanying therewith are represented as linear images such as characters, for example. The present invention is not limited to such and the information and data as above may also be represented as at least one selected from the group consisting of an image such as a still image and a moving image, a voice, a text and a program.

Next, a third embodiment of the present invention will be described.

In the first and the second embodiments as described above, image data is transmitted to a laboratory from the side of a television, a theater and the like. On the other hand, in the third embodiment, image data is transmitted to a laboratory directly from an information apparatus of a customer.

Figure 7:
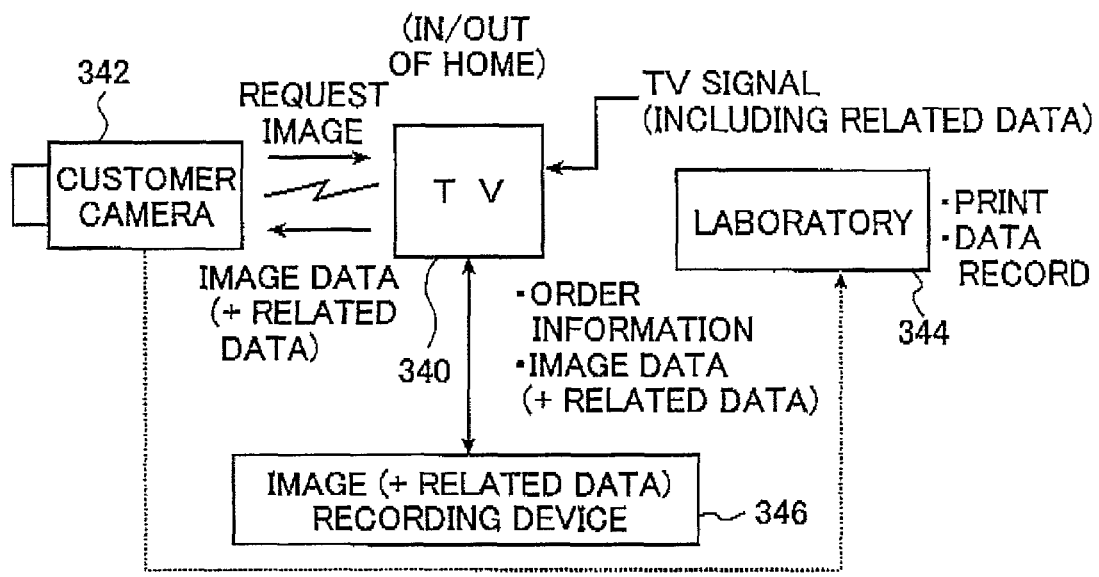
FIG. 7 illustrates a schematic configuration of an ordering system in accordance with a third embodiment of the second aspect of the present invention.

FIG. 7 illustrates a schematic configuration of an ordering system in accordance with the third embodiment.

As shown in FIG. 7, this system is configured basically the same as the system configuration of the first embodiment shown in FIG. 5 and is composed of a television 340 that is a first information apparatus, a camera 342 that is a second information apparatus and a laboratory 344 that is a destination to which goods order data is sent.

The television 340 is a digital television having a network communication function and has a storage device 346 for temporarily recording and accumulating received image data. In addition, the camera 342 is connected to the television 340 by wireless communication and has an image obtaining mode separate from an ordinary photographing. Further, as in the first embodiment, the information apparatus on the customer side is not limited to the camera 342 but may be any apparatus such as a PDA, a personal computer, a cellular phone and a remote control as long as it can transmit information by wireless communication.

If there is a scene that a customer wishes to obtain while watching the television 340, the customer sets the camera 342 to the image obtaining mode and presses its shutter at an optional selection timing. Then, an image data request signal, which requests transfer of an image displayed at that point, is transmitted from the camera 342 to the television 340. This signal may include an order signal indicating a print size or the like.

Upon receiving the image request signal, the television 340 transmits the image data to the camera 342 wirelessly. At this point, if the image request signal also includes the order signal, it is preferable to control an amount of information to conform to the print size, for example, compress the image data, and return it. Further, since an optional image transmitted by the television broadcast is printed, a problem under a copyright may arise depending on how the print is used. Thus, an image quality may be intentionally decreased to an image quality lower than that of the original image to be printed in order to protect a copyright. It is preferable to automatically impose a license fee based on a copyright upon printing at a laboratory 344 as described below, especially when there is an appreciable fear of interference with a copyright.

Upon receiving the image data, on the camera 342 side, it is sufficient to order printing in the same manner as in the case in which an image is photographed ordinarily with the camera 342. Printing may be ordered by transmitting the image data, its related information and the like to the laboratory 344 via network communication directly from the camera 342, or may be ordered by outputting the data to a recording medium and bringing the recording medium to the laboratory 344. The laboratory 344 applies predetermined image processing to the image data according to the related information and the order information to prepare a print or output a recording medium containing the processed data, as in the respective embodiments as described above, In this embodiment it is preferable that the image data, which is transmitted from the television 340 side to the information apparatus such as the camera 342 and a PDA of a customer, includes two components, namely image data on images for displaying (having a lower resolution) and encoded image data on images for printing (having a higher resolution). Under such conditions, only contract laboratories having a key which enables decoding of encoded image data can obtain encoded image data and carry out printing or outputting of recording media. Thus, images can be prevented from being appropriated by a third party.

Next, a fourth embodiment of the present invention will be described.

The fourth embodiment is the case in which an image is actually photographed by a camera and a print with predetermined information added thereto is ordered.

Figure 8:
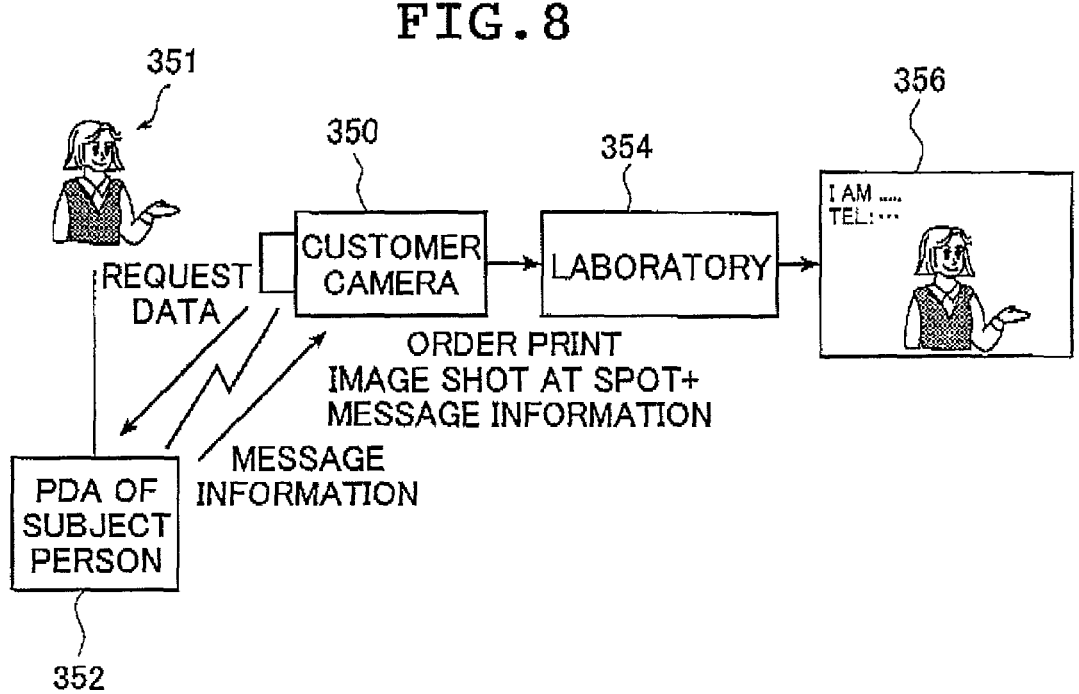
FIG. 8 illustrates a schematic configuration of an ordering system in accordance with a fourth embodiment of the second aspect of the present invention.

FIG. 8 illustrates a schematic configuration of a system of this embodiment.

As shown in FIG. 8, this system basically consists of a camera 350 of a customer, who is a photographer, as a first information apparatus, an information terminal apparatus 352 held by a subject person that is a second information apparatus and a laboratory 354.

The camera 350 is a digital camera that also has a communication function. The information terminal apparatus 352 held by a subject person is not specifically limited but may be any apparatus such as a PDA (hand-held terminal), a cellular phone and the like as long as it has a function of communicating and exchanging information with the camera 350. In addition, the camera 350 is capable of communicating with the information terminal apparatus 352 and transmitting and receiving data to and from the laboratory 354 via network communication.

This embodiment is for exchanging information between the camera 350 held by a photographer and the information terminal apparatus 352 held by a subject person 351 and preparing a print in which a photographed image and message information transmitted by the subject person 351 are composited with each other.

The exchange of information may be arranged such that a data request signal is transmitted from the camera 350 to the information terminal apparatus 352 of the subject person 351 when the photographer photographs the subject person 351, and, in response, the subject person 351 returns message information from the information terminal apparatus 352. Alternatively, the exchange of information may be arranged such that the subject person 351 side transmits a message that should be inserted in an image to be photographed next from the information terminal apparatus 352 to the camera 350 and the camera 350 receives it. For message information, various types of data such as images including a still image and a moving image, voices, a text and a program may be employed.

The photographer transmits an image shot on spot, which is obtained by photographing the subject person 351 with the camera 350, to the laboratory 354 via network communication from the camera 350 together with the message transmitted from the information terminal apparatus 352 of the subject person 351 as print order data. The laboratory 354 composites the image shot on the spot transmitted from the camera 350 and the message information to prepare a print shot on the spot 356.

Next, a fifth embodiment of the present invention will be described.

The fifth embodiment is for transmitting order data as well as image data to a laboratory from an information apparatus on a subject side instead of from a camera, although an image is photographed with the camera as in the fourth embodiment.

Figure 9:
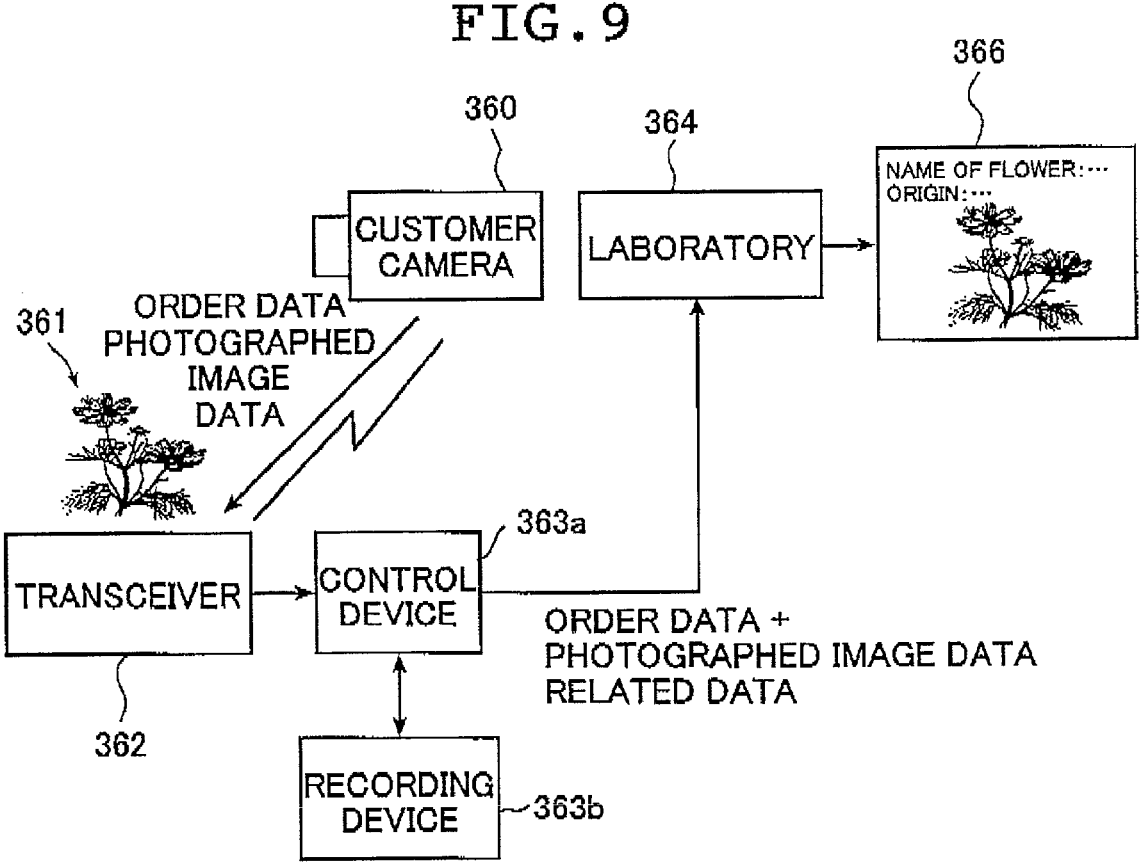
FIG. 9 illustrates a schematic configuration of an ordering system in accordance with a fifth embodiment of the second aspect of the present invention.

FIG. 9 illustrates a schematic configuration of an ordering system of this embodiment.

As shown in FIG. 9, this system basically consists of a camera 360 of a customer, who is a photographer, as a first information apparatus, an information terminal apparatus 362 on a subject side that is a second information apparatus and a laboratory 364.

The camera 360 is a digital camera having a communication function like the camera 350 of the fourth embodiment. In addition, for example, in the case in which a subject is a flower 361 in a flower bed in a park, the information terminal apparatus 362 is a data transceiver or the like embedded in the ground under the flower 361. Upon receiving a signal from the camera 350, the data transceiver transmits the signal to the laboratory 364 through a control device 363a installed in, for example, a park management facility.

When the customer being a photographer photographs the flower 361 with the camera 360 and transmits photographed image data and order data from the camera 360 to the information terminal apparatus (data transceiver) 362, the information terminal apparatus 362 transmits the image data and the order data to the laboratory 364 through the control device 363*a*. In this case, it is preferable that the control device 363*a* stores related information of the subject (here, a name of the flower being the subject or the like) in a storage device 363*b* and adds the information to the order data to transmit it.

Upon receiving transmission of the data, the laboratory 364 prepares a print 366 in which an image of the flower being an image shot on the spot is composited with its related information, for example, a name or an origin of the flower.

Although printing is ordered from a laboratory in each of the embodiments described above, if related information (or message information) is composited in a print, the related information may be composited on the surface of the print or may be printed on the back of the print as shown in FIGS. 8 and 9.

In addition, image data may be outputted to a computer readable recording medium (a floppy disk, a CD-R or the like) together with related information in addition to simply outputting it as a print. In this case, it is possible to record voice data in addition to image data such as a still image and a moving image together in advance to reproduce the data and execute the procedure by a computer. It is sufficient for the customer to inform that, for example, the customer wishes the image data to be outputted to a CD-R or the like instead of being printed based on the order data.

On the other hand, embodiments to be described below are the case in which a customer orders not only a print but also general goods while watching an advertisement on the screen of a television or the like.

Next, a sixth embodiment of the present invention will be described.

Figure 10:
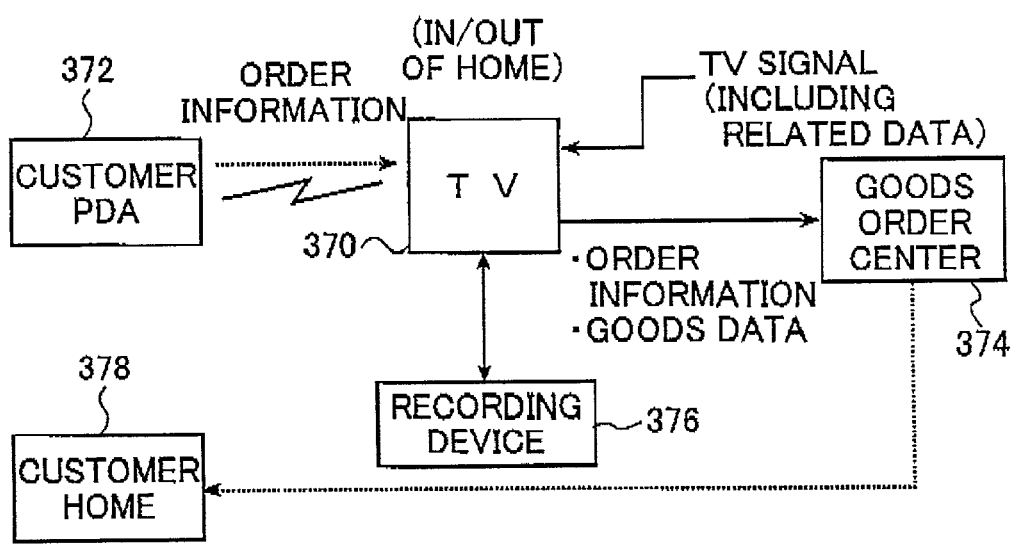
FIG. 10 illustrates a schematic configuration of an ordering system in accordance with a sixth embodiment of the second aspect of the present invention.

FIG. 10 illustrates a schematic configuration of an ordering system in this embodiment.

As shown in FIG. 10, this system is basically composed of a television 370 that is a first information apparatus, an information terminal apparatus 372, for example a PDA, of a customer, that is a second information apparatus and a goods order center 374 to which goods order data is sent.

The television 370 is a television having a network communication function and has a storage device 376 for recording and accumulating received data, related information of advertised goods or the like as in the above-mentioned embodiments.

A television signal including data relating to advertised goods is transmitted to the television 370. Upon receiving the signal, the television 370 displays an advertisement of the goods on a screen and, at the same time, temporarily stores related information in the storage device 376.

If there are goods that a customer wishes to buy while watching an advertisement on the screen of the television 370, the customer presses a key or the like of the information terminal apparatus 372 such as a PDA at hand to transmit a customer ID (customer identification information) and order information to the television 370. Information characteristic of the goods such as a specification, for example, a product number, the number of pieces of goods, a color and a size is added to the order information. Upon receiving the customer ID and the order information, the television 370 transmits related information (goods data or the like) corresponding to the order information of the pertinent goods as goods order data to the goods order center 374 via network communication or the like. Upon receiving the goods order data, the goods order center 374 delivers the goods to a home 378 of the customer by a home delivery service based on the data. In this case, the goods order center 374 may return data for inputting an order or order confirmation data to a place designated by the customer separately for confirmation of the order.

Next, a seventh embodiment of the present invention will be described.

Figure 11:
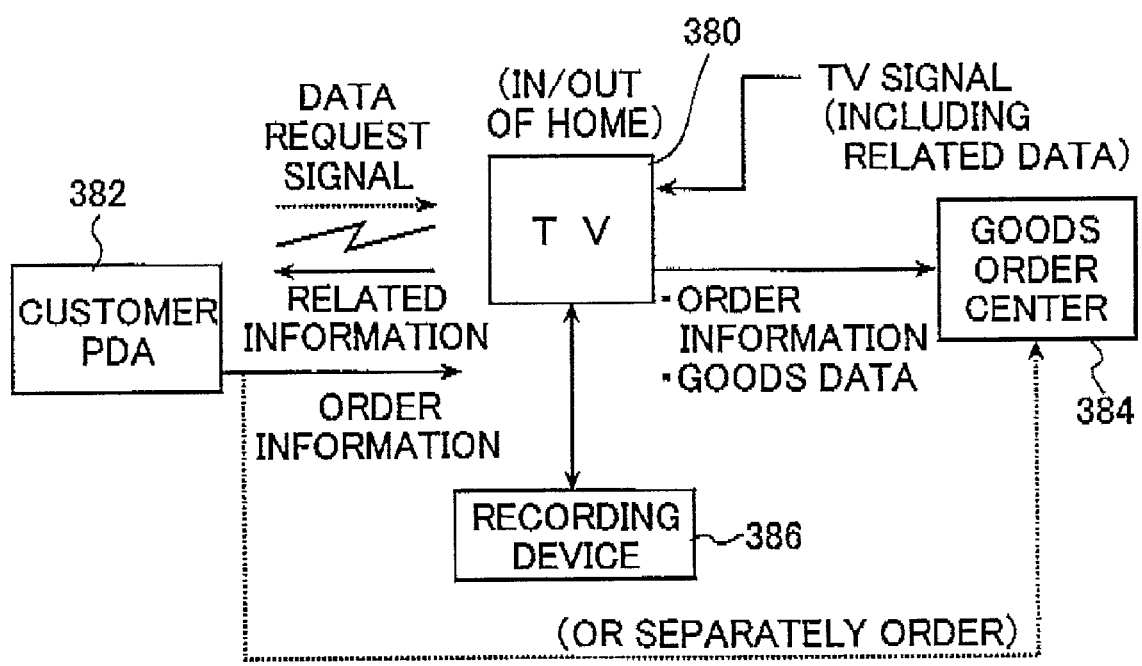
FIG. 11 illustrates a schematic configuration of an ordering system in accordance with a seventh embodiment of the second aspect of the present invention.

FIG. 11 illustrates a schematic configuration of an ordering system of this embodiment.

As shown in FIG. 11, the system of this embodiment also has a configuration similar to that of the system of the sixth embodiment shown in FIG. 10 and is composed of a television 380, an information terminal apparatus 382 of a customer and a goods order center 384. In addition, the television 380 includes a storage device 386. A television signal including data related to advertised goods is transmitted to the television 380. Upon receiving the television signal, the television 380 displays an advertisement of the goods on a screen and, at the same time, temporarily stores related information in the storage device 386.

A customer transmits a data request signal from the information terminal apparatus 382 at hand to the television 380 at an optional selection timing if there are goods that the customer wishes to buy while watching the television 380. Upon receiving the data request signal, the television 380 returns goods related information to the information terminal apparatus 382 of the customer. The received goods related information is reproduced and displayed on a monitor of the information terminal apparatus 382. The customer sees this display and edits data for inputting an order such as a specification, for example, a product number, the number of pieces, a color and a size to prepare goods order data.

Then, the customer adds data such as a customer ID and a method of receiving goods and transmits goods order data to the television 380 from the information terminal apparatus 382.

Upon receiving the goods order data, the television 380 transmits the goods order data to the goods order center 384 via network communication. The transmission of the goods order data may be performed collectively for goods or may vary for each commercial. The goods order center 384 dispatches ordered goods to each customer in accordance with the goods order data.

The goods may be delivered to a home of the customer by a home delivery service, or the customer may receive the goods at a nearby agent shop (e.g., a convenience store or the like).

In addition, goods may be separately ordered by a customer rather than through a television as described above. For example, the ordering system may be a system that allows a customer to order goods through a laboratory while ordering printing of photographs.

It is preferable that, if a customer obtains a scene in a television program from a television by his information terminal apparatus, the customer can see not only goods but also an advertisement of goods related to the goods in question on the screen. Moreover, it is preferable that, if a customer presets a specific goods item, conditions for automatically obtaining (capturing) information and the like with respect to a television program by his information terminal apparatus, a displayed image, goods information, information related to the image or the goods, or the like, is automatically captured in the information terminal apparatus of the customer at the point when an advertisement of the item is broadcast.

That is to say, it is preferable that a mode, in which images and goods information are to be automatically obtained or captured, can be set. As an example, IDs each of which is specific to a given kind of goods may be added to broadcast data in advance so as to use for the setting of such an auto-capturing mode as above according to the kind of goods, Specifically, an advertisement for an automobile, for example, can be auto-captured conveniently every time when such an advertisement is displayed on a television. Or again, with respect to a game machine in a game arcade, a pachinko parlor or the home, conditions for automatically capturing images may previously be set and transmitted from an information apparatus such as a PDA of a customer to the game machine. Thus, an image can be auto-captured conveniently when, for example, the score made is high or exceeds a predetermined level, or a predetermined scene has been cleared.

Further, although the case in which a customer watches an advertisement on the screen of a television to order goods is described in the above-mentioned sixth and seventh embodiments, a display screen is not limited to that of a television but it is possible to apply the system to the case in which the customer watches an advertisement (image) on a screen such as a screen of a personal computer, a screen of a game machine, or a poster (regardless of whether it is in or out of the home and provided that a transceiver is provided on the back of the poster) and orders goods. In addition, the information terminal apparatus of the customer is not limited to, for example, a hand-held terminal such as a PDA but an apparatus having an information communicating function such as a camera, a personal computer, a cellular phone and a remote control can be used.

Next, an eighth embodiment of the present invention will be described.

In the first and third embodiments as described above, the image data that the first information apparatus such as the television has received is sent to the laboratory directly or through the information terminal apparatus of a customer. The eighth embodiment is directed to the case in which an original image stored in a broadcast station and image data of the original image received by a television or the like are selectively used as required.

Figure 12:
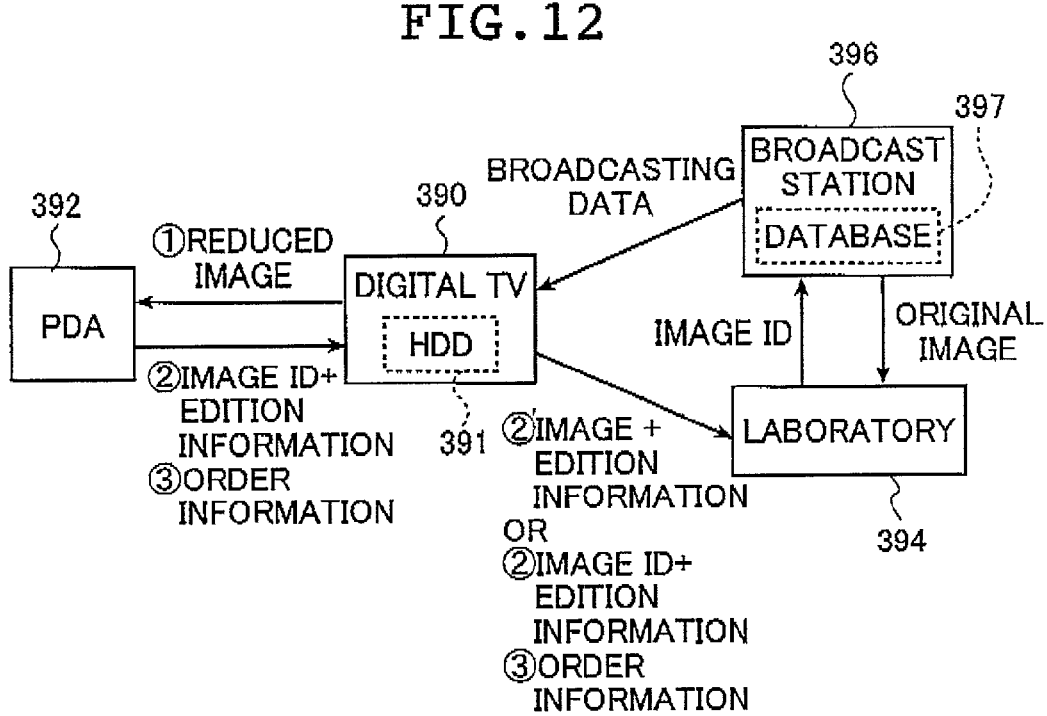
FIG. 12 illustrates a schematic configuration of an ordering system in accordance with an eighth embodiment of the second aspect of the present invention.

FIG. 12 illustrates a schematic configuration of an ordering system of the eighth embodiment.

As shown in FIG. 12, this ordering system comprises a television 390 which is a first information apparatus, a hand-held terminal (hereinafter typified by a PDA) 392 of a customer which is a second information apparatus, a laboratory 394 to which goods order data is sent, and a broadcast station 396 which transmits an image received by the television 390.

The television 390 is a digital television having a communication function, and has a storage device (HDD) 391 for temporarily recording and storing received image data. The PDA 392 is connected to the television 390 by wireless communication and has an image obtaining mode different from the ordinary photographing mode. As in the first embodiment, the information apparatus on the customer side is not limited to the hand-held terminal such as the PDA 392 but may also include information terminal apparatuses such as a personal computer, a cellular phone, a camera and a remote controller as long as they can transmit information by wireless communication.

When there is a scene that the customer wishes to obtain, the customer performs a key manipulation or a designation by hand on the PDA 392 at an optional or desired selection timing while watching the television 390. As a result, an image data request signal for requesting transfer of a displayed image is sent from the PDA 392 to the television 390. This signal may include an order signal indicating a print size or the like.

Upon receipt of the image data request signal, the television 390 transmits image data of the displayed image to the PDA 342 wirelessly. That is, the PDA 392 receives a low-resolution image adapted for monitor display. Preferably, the image data is for example compressed or thinned out to control the amount of data (information) in accordance with the display image size on a monitor of the PDA 392, or in accordance with the print size if the image data request signal also includes the order signal, whereupon a reduced image with a low resolution can be transmitted. Identification information (ID) of the displayed image is also preferably attached to the image data.

The PDA 392 that received the image data displays the image, for example the reduced image on the monitor of the PDA 392. After the customer confirms the image, an image ID or image data of the reduced image is returned to the television 390 together with order data and further related information of the displayed image.

While watching the image displayed on the monitor of the PDA 392, the customer performs desired image processing steps from among modification processing such as density/color adjustment, gradation adjustment, modification in general impression, and finishing modification to sepia-toned finishing or monochrome finishing, as well as edition processing such as production of an index image for a plurality of frames, image composition, layout/size adjustment, and character insertion. The customer may perform other processing that can be performed in the image processing device according to the first aspect as described above, or image processing such as the modification processing and the edition processing by means of commercially available software programs.

In this case, it is preferred that the order data also includes image processing information from the customer such as information concerning the modification processing (hereinafter simply referred to as "modification information") and information concerning the edition processing (hereinafter simply referred to as "edition information"), in other words, image processing information as to which frame the customer processed, or which image processing the customer performed among the modification processing and edition processing.

On the television 390 side that received the image ID or the image data of the reduced image together with the order data and further the related information, the image ID or the image data of the reduced image is used to search for the image data of the corresponding displayed image in the storage device 391. The image data of the image obtained by the search, the order data received, and the related information are transmitted to the laboratory 394 as the goods order data for placing an order for printing or recording on a recording medium. That is, an order is placed for prints or a recording medium having data recorded therein. It should be noted here that the order data may include the image processing information.

On the laboratory 394 side, the image data is subjected to specified image processing steps based on the order data and related information received as in each of the embodiments as described above. The thus processed image data is used to produce prints or output a recording medium. If the order data includes the image processing information, the modification processing and edition processing can be reproduced on the image data according to the image processing information (modification information and edition information) transmitted together with the image data.

When the print size requested in the order data is large, the resolution of the image data is very often insufficient to obtain an image print of high quality and high resolution data is necessary. In this case, according to this embodiment, the television 390 side transmits the image ID, the order data (which may include the image processing information) and further the related information that were received from the PDA 392, to the laboratory 394 as the goods order data to thereby place an order for printing and an order for recording on a recording medium.

On the laboratory 394 side, the received image ID is transmitted to the broadcast station 396, where a database 397 is searched using the transmitted image ID to read out high-resolution image data of the original image used in broadcasting. The image ID is returned with the image data of the original image obtained by the search from the broadcast station 396 side to the laboratory 394 side.

Thereafter, on the laboratory 394 side, the image data of the original image received from the broadcast station 396 is used together with the order data and the related information of the corresponding image ID received from the PDA 392 to perform specified image processing steps as in each of the embodiments as described above. For example, when the order data includes the image processing information, the modification processing and edition processing are reproduced in accordance with the image processing information to thereby produce a print or output a recording medium.

The method for transferring the original image used in broadcasting from the broadcast station 396 to the laboratory 394 is not particularly limited but any conventionally known method can be employed. For example, the method disclosed in commonly assigned JP 10-171027 A can be employed.

If a large print size is requested, the original image in the broadcast station 396 is used, and the image received on the television 390 is otherwise used. This selective use of the original image and the received image in accordance with the requested print size enables outputting a print on which a high quality image is reproduced. The laboratory 394 side may determine as to which of the original image and the image received on the television 390 is used.

The requested print size is not the sole factor for determining which of the original image and the received image is used, and determination of the image to be used may depend on any factor. For example, a method may be applied in which the original image is selected when the original image is present in the database 397 of the broadcast station 396, and otherwise the image received on the television 390 is used.

According to this embodiment, the image data transmitted to the PDA 392 has a low resolution, but even when any image on the air is to be printed, a print having a high-resolution and high-quality image can be produced from the original image in the laboratory 394. The laboratory 394 in which automatic charging based on the copyright can be performed enables appropriate protection of the copyright.

The image accompanying data (various types of data including still image, moving image, voice, text and program) which is not included in the broadcasting data (transmission data) may be stored in the database 397 of the broadcast station 396 so that the image accompanying data can be also supplied in response to the image request from the customer for use in composition on a print or recording on a recording medium. In this case, charging may be also done in accordance with the image accompanying data.

Next, a ninth embodiment of the present invention will be described.

In the third, seventh and eighth embodiments as described above, the image data of the image displayed on the first information apparatus such as the television and designated from the customer side is returned to the second information apparatus on the customer side such as the camera or the hand-held terminal including the PDA which was used for designating the displayed image and which has a communication function. In contrast, the ninth embodiment transmits the displayed image not only to the information apparatus on the customer side in which the displayed image was designated, but also to the destination (or information apparatus) designated by the customer.

Figure 13:
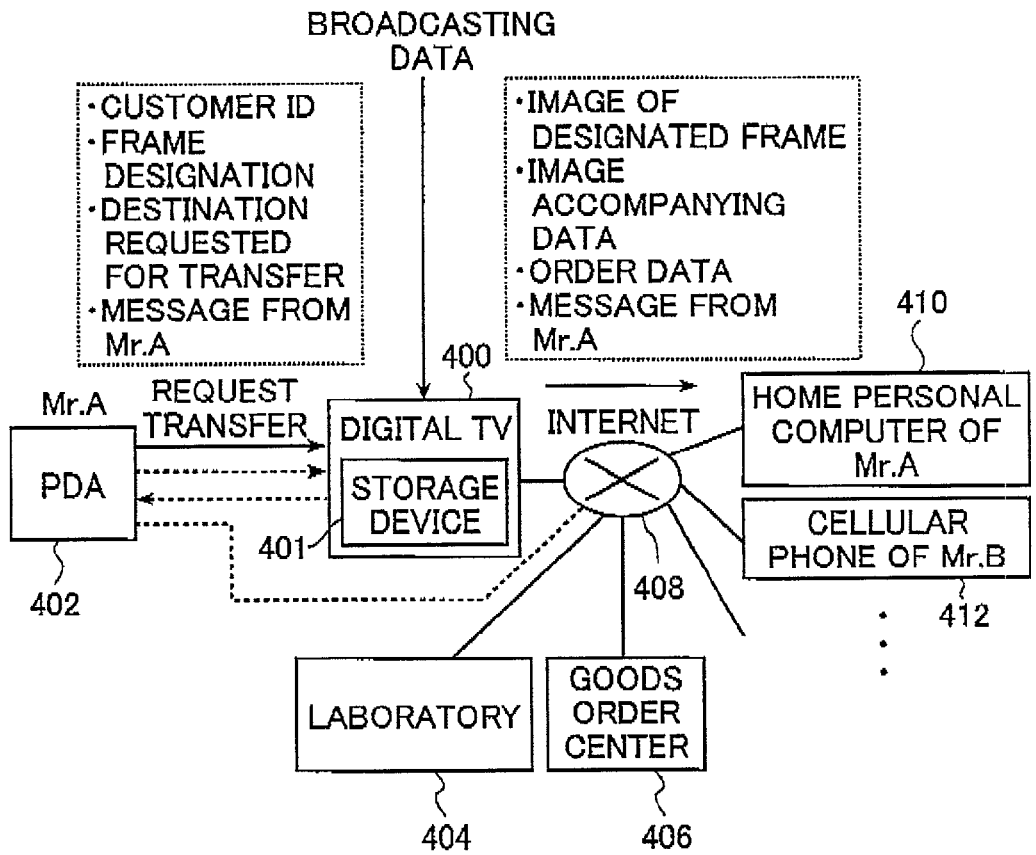
FIG. 13 illustrates a schematic configuration of an ordering system in accordance with a ninth embodiment of the second aspect of the present invention.

FIG. 13 illustrates a schematic configuration of an ordering system of the ninth embodiment.

As shown in FIG. 13, the ordering system of this embodiment comprises a television 400 which is a first information apparatus, a hand-held terminal (hereinafter typified by a PDA) 402 of a customer A which is a second information apparatus, a laboratory 404 and a goods order center 406 to which goods order data is sent, a communication network called the Internet 408 which is connected to the television 400, the laboratory 404 and the goods order center 406, respectively, and a home personal computer 410 of the customer A and a cellular phone 420 of a customer B to which the Internet 408 is connected.

The components used may be the same as those disclosed in each of the embodiments described above. Therefore, detailed description will be omitted.

The television 400 receives broadcasting data (television signal) from the television station and displays a reproduced image on the display screen while recording image data of the displayed image on a storage device 401.

When there is a scene that the customer A wishes to obtain, the customer A preliminarily selects an image obtaining mode in the PDA 402 to designate the scene (image frame) at an optional or desired selection timing, while watching the image displayed on the screen of the television 400. After the scene is designated, image request data including a transfer request is transmitted from the PDA 402 to the television 400 side. The image request data includes orderer identification information (customer ID), scene (image-frame) designating information and information concerning the destination (contact address) to which the transfer of the image data is requested. In addition to these types of information, the image request data may also include order information and message information from the customer A.

Inclusion of the information concerning the destination (contact address) to which the transfer of the image data is requested in the image request data to be transmitted from the customer's PDA 402 to the television 400 enables transfer to the home personal computer 410 via the Internet 408 in case of lack of memory of the customer's PDA 402 or request for high quality image data. In addition, this is also effective when the customer A that found a desired image or goods while watching the television 400 away from home, wants to carefully consider at home or to give some information to his friend prior to actually placing an order. The frame of the scene can be designated in the PDA 402 and the information concerning the destination of the image data can be transmitted to the television 400 side.

In this case, the timing information for the scene (frame) designation may be temporarily stored on the PDA 402 side to transmit at a different timing the information concerning the destination to which the transfer of the displayed scene image is requested. Alternatively, a set of the timing information for the frame designation and the information concerning the destination in the transfer request may be transmitted when each frame is designated. Further, the destination may be set for each frame image designated or for a plurality of frame images in a batched manner.

Upon receipt of the image request data from the PDA 402, the television 400 reads out image data of the designated scene (frame) image from the storage device 401 based on the scene (image-frame) designating information in the received image request data. The image data is transmitted through the network to the destination designated based on the information concerning the destination (contact address) included in the received image request data, after the image related (accompanying) data (goods characteristic information), the order data and further optionally the order information and the message information from the customer A have been added thereto.

Any information apparatus may be designated as the destination, and examples include the home personal computer 410, and the cellular phone 412, a PDA or a personal computer that his friend possesses. It is needless to say that the customer A may designate his PDA 402 or cellular phone as the destination in the embodiment under consideration.

Further, the image data to be transferred from the television 400 to the designated destination may be the image displayed on the television 400 per se or the reduced image thereof.

The image data to be transferred from the television 400 to the designated destination may be replaced by the data on the site to which reference is made on the image displayed on the television 400. In this case, the designated destination side that received the data on the site for reference can obtain the image and its accompanying data by getting access to the site.

If the customer A or B wants to place an order for an image or goods, the customer A or B places the order by transmitting from the designated contact apparatus, that is, the home personal computer 410 or the cellular phone 412, a set of the image data or goods data, its related information and the order data (including the customer ID, order information and message information from the customer A) to the laboratory 404 or the goods order center 406 as the goods order data.

Upon receipt of the goods order data, the laboratory 404 subjects the received image data to specified image processing steps in accordance with the order data to thereby produce a print or a recording medium having the image data recorded therein. On the other hand, the goods order center 406 delivers the ordered goods to each customer in accordance with the goods order data.

In addition, in each of the embodiments described above, an accident or a trouble can be prevented by temporarily storing order information (goods order data) received from a customer at a laboratory or a goods order center and later transmitting information for confirming the order to each customer for order confirmation.

Thus, it is preferable that the information for confirmation which includes goods order data and to which order transmitting route information indicating a route taken for placing an order is added for each order item is transmitted to a contact apparatus of each customer in accordance with a customer ID.

As described above in detail, according to each of the embodiments, a customer can easily place an order for printing of a scene on a TV or movie screen or an image actually taken with a camera, at an optional or desired timing or for recording image data of the scene on a recording medium while watching the TV or movie screen. The customer can also place an order for goods simply while watching an advertisement screen on a television or the like.

In each of the embodiments described above, an order was placed for a print of an image displayed on a television or the like, a print of an image actually taken with a camera, a recording medium having its image data recorded therein, or goods on an advertisement screen of a television or the like. However, the present invention is not limited thereto and at least one of various types of data including moving image, voice, text and program may be ordered.

For example, moving images within a specified period of time (for example a seconds) including the time at which a display screen of a television, a movie or a display was designated, to be more specific, moving images formed from a plurality of displayed images which include an image displayed at the designated time, or image data of all moving images in one commercial may be obtained. Alternatively, a program per se for reproducing an execution screen in a game machine such as scenes of one stage may be obtained.

In the present invention, the image displayed on the display screen of a digital television includes not only a picture (image) received through a tuner from an ordinary telecast but also a picture (image) distributed through a communication network such as the Internet. Further, the image display device for displaying the images is not limited to the digital television but may also be a personal computer having in particular a picture display function.

The image processing system and the ordering system of the present invention has been described above in detail. It is needless to mention that the present invention is not limited to the above-mentioned embodiments but various improvements or alterations may be applied to it without departing from the spirit and the scope of the present invention.

As described above, according to the first aspect of the present invention, even if a plurality of subject persons exist, information concerning subject persons can be automatically composited with an image, which is convenient for obtaining the information concerning the subject persons or arranging information in order. In particular, the image processing system is very effective in the information exchange among participants in a party.

As also described above, according to the second aspect of the present invention, a customer can easily place an order for printing an image of a scene at an optional or desired timing, or again, at a preset timing while watching the screen of a television or the like, or an order for goods at a preset timing while watching an advertisement screen of the television or the like.

What is claimed is:

1. An ordering system comprising:
a first information apparatus having an image displaying unit and a communication function; and
a second information apparatus capable of transmitting order data for specifying an image displayed on said image displaying unit of said first information apparatus at a time selected by a customer to said first information apparatus by wireless communication with respect to images displayed on said image displaying unit of said first information apparatus, wherein said second information apparatus prepares order indication information for specifically indicating contents of an order and including at least the number of goods relating to said specified displayed image and a method of receiving said goods, and transmits said order data including said prepared order indication information and orderer identification information prepared in advance that specifies said customer to said first information apparatus at said selected time by the wireless communication, wherein said first information apparatus having received said order data adds predetermined data of said goods relating to said displayed image corresponding to said selected time to said order data to prepare goods order data and transmits the goods order data to a third information apparatus in a predetermined destination of transmission using said communication function, and wherein said order data is transmitted in advance from said second information apparatus to said first information apparatus by the customer as reservation information relating to said displayed image of said first information apparatus, said first information apparatus regards a point in time when said displayed image reserved by the reservation information is displayed on said image displaying unit as said selected time, automatically obtains predetermined data relating to said displayed image of said image displaying unit at said selected time and automatically transmits the predetermined data to said second information apparatus, and said second information apparatus automatically obtains said predetermined data.

2. The ordering system according to claim 1, wherein said displayed images are images displayed successively on said image displaying unit of said first information apparatus, information on said selected time to be obtained by said first information apparatus is time information in said second information apparatus accompanying said order data or a receiving time itself of said order data in said first information apparatus, and said predetermined data is image data of said specified displayed image corresponding to said selected time or goods characteristic information relating said displayed image.

3. The ordering system according to claim 1, wherein said predetermined destination of transmission of said goods order data is set in said second information apparatus or set in said first information apparatus or set according to said predetermined data.

4. The ordering system according to claim 1, wherein said order data is transmitted from said second information apparatus to said first information apparatus by the customer at said selected time while watching said displayed image.

5. The ordering system according to claim 1, wherein said order data includes print order data for ordering a print of an image displayed on said image displaying unit of said first information apparatus at said selected time, said predetermined data includes image data of an image displayed on said image displaying unit of said first information apparatus at said selected time, compressed image data or processed image data thereof and information related thereto, said goods order data includes print order data for ordering a print of an image displayed on said image displaying unit of said first information apparatus, and said first information apparatus transmits said print order data to said predetermined destination of transmission and said predetermined destination of transmission applies print processing to said print order data or records and accumulates said print order data in a predetermined image data accumulating device.

6. The ordering system according to claim 5, wherein said print order data includes print instruction information or data recording instruction information.

7. The ordering system according to claim 5, wherein said related information includes at least one of still image data, moving image data, voice data, text data and program data and is printed in association with said image data and said data corresponding to said displayed image and outputted to a computer readable recording medium in association with said image data or said data corresponding to said displayed image.

8. The ordering system according to claim 5, wherein said related information includes edition information and/or processing information of said image data or said data corresponding to said displayed image.

9. The ordering system according to claim 1, wherein said order data includes recording medium order data for ordering a recording medium in which data corresponding to an image displayed on said image displaying unit of said first information apparatus at said selected time is recorded, said predetermined data includes data corresponding to said displayed image at said selected time and information related thereto, said goods order data includes recording medium order data for ordering a recording medium in which data corresponding to said displayed image is recorded, and said first information apparatus transmits said recording medium order data to said predetermined destination of transmission and said predetermined destination of transmission applies processing for recording said recording medium order data in said recording medium or records and accumulates said recording medium order data in a predetermined image data accumulating device.

10. The ordering system according to claim 9, wherein said data corresponding to said displayed image includes image data of said displayed image at said selected time and compressed image data or processed image data thereof.

11. The ordering system according to claim 9, wherein said data corresponding to said displayed image is at least one of moving image data, voice data, text data and program data relating to said displayed image at said selected time.

12. The ordering system according to claim 9, wherein said recording medium order data includes information on instruction for recording in said recording medium or information on instruction for recording in said predetermined image data accumulating device.

13. The ordering system according to claim 1, wherein, when said first information apparatus is a television receiver and said predetermined data of said goods relating to said displayed image at said selected time includes image data of said displayed image of said television receiver, image data of an image received by said television receiver and displayed thereon and original image data in a broadcasting station transmitting the image data to said television receiver are coordinated for use as said image data of said displayed image of said television receiver.

14. The ordering system according to claim 1, wherein said goods order data of the customer is accumulated in a storage buffer, and information for confirmation with order transmitting route information added to said goods order data is transmitted to said destination of communication of the customer for each order item based on orderer identification information.

* * * * *